US012701331B2

(12) United States Patent (10) Patent No.: US 12,701,331 B2
Fujii (45) Date of Patent: Aug. 4, 2026

(54) STOP DRIVE CONTROL DEVICE, OPERATION METHOD OF STOP DRIVE CONTROL DEVICE, OPERATION PROGRAM OF STOP DRIVE CONTROL DEVICE, AND IMAGING APPARATUS

(71) Applicant: FUJIFILM Corporation, Tokyo (JP)

(72) Inventor: Masato Fujii, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 18/607,150

(22) Filed: Mar. 15, 2024

(65) Prior Publication Data

US 2024/0334071 A1     Oct. 3, 2024

(30) Foreign Application Priority Data

Mar. 29, 2023     (JP) ................................. 2023-053308

(51) Int. Cl.
*H04N 23/75* (2023.01)
*G03B 7/00* (2021.01)
*H04N 23/60* (2023.01)

(52) U.S. Cl.
CPC ............. *H04N 23/75* (2023.01); *H04N 23/64* (2023.01); *G03B 7/00* (2013.01)

(58) Field of Classification Search
CPC ......... H04N 5/23209; H04N 5/232125; H04N 5/23222; H04N 23/69; H04N 23/75; G03B 7/00
See application file for complete search history.

(56) References Cited

U.S. PATENT DOCUMENTS

| | | | |
|---|---|---|---|
| 2011/0310457 A1 | 12/2011 | Sasaki | |
| 2016/0037040 A1* | 2/2016 | Asano .................... | H04N 23/75 |
| | | | 359/823 |
| 2020/0314343 A1* | 10/2020 | Urakami .............. | H04N 23/667 |
| 2021/0274087 A1* | 9/2021 | Shigeta ................. | H04N 23/64 |

FOREIGN PATENT DOCUMENTS

JP          2012-003083 A     1/2012

* cited by examiner

*Primary Examiner* — Xi Wang
(74) *Attorney, Agent, or Firm* — Studebaker Brackett PLLC

(57) ABSTRACT
A CPU of a controller of an imaging apparatus includes a stop driving controller. The stop driving controller performs drive control of a stop opening degree adjustment mechanism based on opening degree history information in which a current opening degree is associated with a target opening degree in accordance with a fluctuation of a focal length of a zoom lens.

14 Claims, 28 Drawing Sheets

⟨CASE WHERE FIFTH FRAME FROM START OF ZOOM OPERATION IS STORED⟩

82

CURRENT OPENING DEGREE

55

81

TARGET OPENING DEGREE

56

76

RW CONTROLLER

72

OPENING DEGREE HISTORY INFORMATION

| FRAME No. | CURRENT OPENING DEGREE | TARGET OPENING DEGREE |
|-----------|------------------------|-----------------------|
| 1 | 35 | 50 |
| 2 | 45 | 52 |
| 3 | 55 | 54 |
| 4 | 55 | 56 |
| 5 | 55 | 56 |

\<CASE WHERE STOP DRIVE CONTROL IS PERFORMED ON
FOURTH FRAME FROM START OF ZOOM OPERATION\>

OPENING DEGREE HISTORY INFORMATION

| FRAME No. | CURRENT OPENING DEGREE | TARGET OPENING DEGREE |
|-----------|------------------------|------------------------|
| 1 | 35 | 50 |
| 2 | 45 | 52 |
| 3 | 55 | 54 |

~72

RECORDS FOR FIVE FRAMES
TRACING BACK FROM CURRENT
FRAME ARE NOT STORED

PERFORM DRIVE CONTROL OF STOP OPENING
DEGREE ADJUSTMENT MECHANISM BASED ON
TARGET OPENING DEGREE AND CURRENT OPENING
DEGREE DERIVED IN CURRENT FRAME

FIG. 11

THERE IS DIFFERENCE BETWEEN
TARGET OPENING DEGREE AND
CURRENT OPENING DEGREE
DERIVED IN CURRENT FRAME

DRIVE STOP OPENING DEGREE
ADJUSTMENT MECHANISM TO
SET OPENING DEGREE TO
TARGET OPENING DEGREE

⟨CASE WHERE STOP DRIVE CONTROL IS PERFORMED ON
SIXTH FRAME FROM START OF ZOOM OPERATION⟩

FIG. 14

⟨CASE WHERE STOP DRIVE CONTROL IS PERFORMED ON
35TH FRAME FROM START OF ZOOM OPERATION⟩

OPENING DEGREE HISTORY INFORMATION

| FRAME No. | CURRENT OPENING DEGREE | TARGET OPENING DEGREE |
|---|---|---|
| ⋮ | | |
| 30 | 48 | 50 |
| 31 | 48 | 50 |
| 32 | 48 | 50 |
| 33 | 48 | 50 |
| 34 | 48 | 50 |

~72

THERE IS DIFFERENCE BETWEEN TARGET OPENING
DEGREE AND CURRENT OPENING DEGREE OF
RECORDS FOR FIVE FRAMES TRACING BACK FROM
CURRENT FRAME, AND THERE IS NO CHANGE IN
TARGET OPENING DEGREE OF RECORDS FOR FIVE
FRAMES TRACING BACK FROM CURRENT FRAME

STOP DRIVE OF STOP OPENING
DEGREE ADJUSTMENT MECHANISM

FIG. 17

⟨CASE WHERE STOP DRIVE CONTROL IS PERFORMED ON 50TH FRAME FROM START OF ZOOM OPERATION⟩

OPENING DEGREE HISTORY INFORMATION

| FRAME No. | CURRENT OPENING DEGREE | TARGET OPENING DEGREE |
|---|---|---|
| ⋮ | | |
| 45 | 48 | 50 |
| 46 | 50 | 52 |
| 47 | 50 | 52 |
| 48 | 52 | 54 |
| 49 | 52 | 55 |

~72

THERE IS DIFFERENCE BETWEEN TARGET OPENING DEGREE AND CURRENT OPENING DEGREE OF RECORDS FOR FIVE FRAMES TRACING BACK FROM CURRENT FRAME, BUT THERE IS CHANGE IN TARGET OPENING DEGREE OF RECORDS FOR FIVE FRAMES TRACING BACK FROM CURRENT FRAME

PERFORM DRIVE CONTROL OF STOP OPENING DEGREE ADJUSTMENT MECHANISM BASED ON TARGET OPENING DEGREE AND CURRENT OPENING DEGREE ACQUIRED IN CURRENT FRAME

Figure 19:
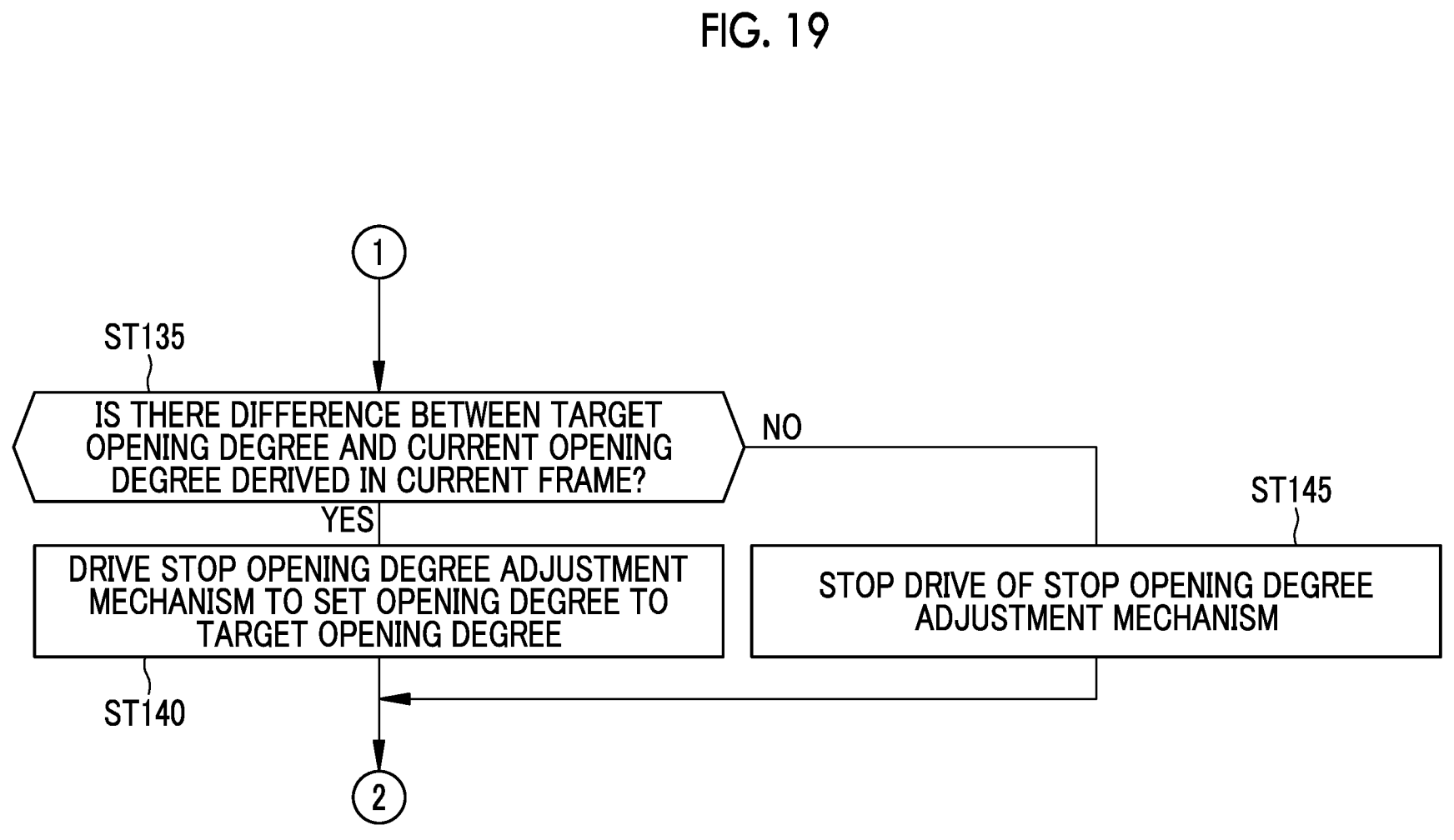

IS THERE DIFFERENCE BETWEEN TARGET OPENING DEGREE AND CURRENT OPENING DEGREE DERIVED IN CURRENT FRAME?

NO

ST145

STOP DRIVE OF STOP OPENING DEGREE ADJUSTMENT MECHANISM

YES

ST140

DRIVE STOP OPENING DEGREE ADJUSTMENT MECHANISM TO SET OPENING DEGREE TO TARGET OPENING DEGREE

FIG. 20

⟨CASE WHERE STOP DRIVE CONTROL IS PERFORMED ON 35TH FRAME FROM START OF ZOOM OPERATION⟩

OPENING DEGREE HISTORY INFORMATION

| FRAME No. | CURRENT OPENING DEGREE | TARGET OPENING DEGREE |
|---|---|---|
| ⋮ | | |
| 30 | 48 | 50 |
| 31 | 49 | 51 |
| 32 | 50 | 52 |
| 33 | 51 | 53 |
| 34 | 52 | 54 |

~72

THERE IS DIFFERENCE, WHICH IS EQUAL TO OR LESS THAN FIVE, BETWEEN TARGET OPENING DEGREE AND CURRENT OPENING DEGREE OF RECORDS FOR FIVE FRAMES TRACING BACK FROM CURRENT FRAME, AND THERE IS CHANGE IN TARGET OPENING DEGREE OF RECORDS FOR FIVE FRAMES TRACING BACK FROM CURRENT FRAME BY CHANGE AMOUNT EQUAL TO OR LESS THAN FIVE

INCREASE DRIVING FORCE APPLIED TO STOP FROM STOP OPENING DEGREE ADJUSTMENT MECHANISM

FIG. 22

72 <CASE WHERE STOP DRIVE CONTROL IS PERFORMED ON 35TH FRAME FROM START OF ZOOM OPERATION>

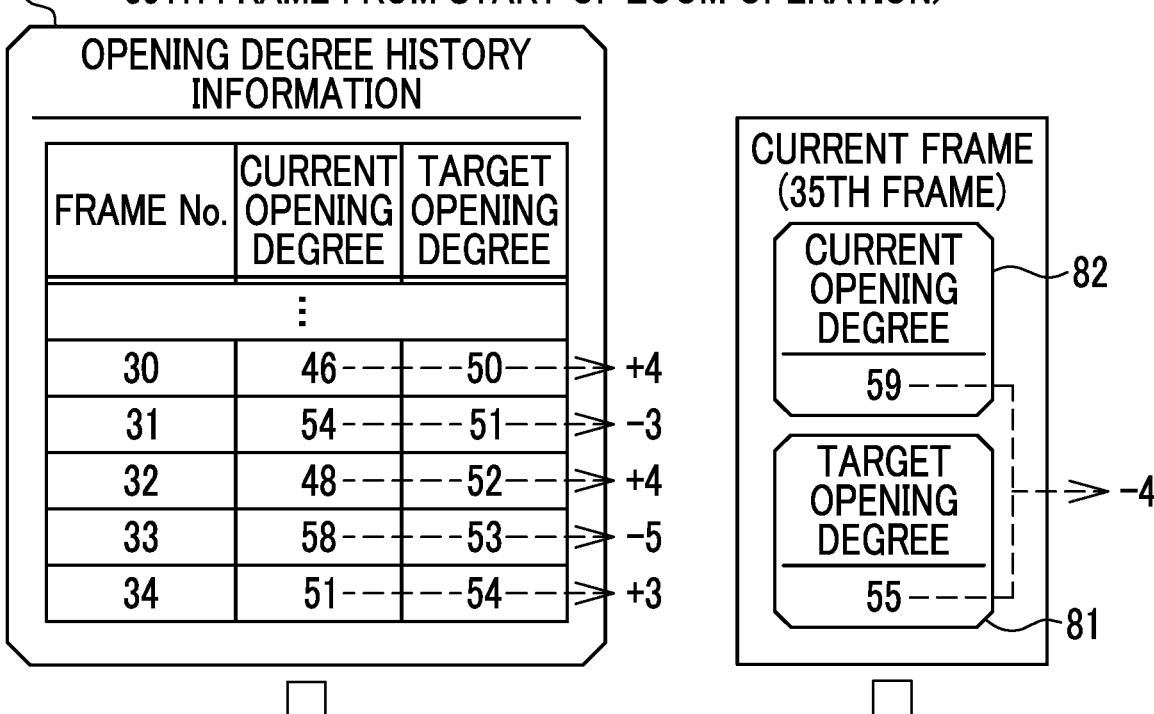

OPENING DEGREE HISTORY INFORMATION

| FRAME No. | CURRENT OPENING DEGREE | TARGET OPENING DEGREE | |
|---|---|---|---|
| ⋮ | | | |
| 30 | 46 | 50 | +4 |
| 31 | 54 | 51 | -3 |
| 32 | 48 | 52 | +4 |
| 33 | 58 | 53 | -5 |
| 34 | 51 | 54 | +3 |

CURRENT FRAME (35TH FRAME)

| CURRENT OPENING DEGREE | |
|---|---|
| 59 | 82 |

| TARGET OPENING DEGREE | |
|---|---|
| 55 | -4 |

81

THERE IS DIFFERENCE, WHICH IS EQUAL TO OR LARGER THAN THREE, BETWEEN TARGET OPENING DEGREE AND CURRENT OPENING DEGREE OF RECORDS FOR FIVE FRAMES TRACING BACK FROM CURRENT FRAME, AND DIFFERENCE BETWEEN TARGET OPENING DEGREE AND CURRENT OPENING DEGREE OF RECORD OF PREVIOUS FRAME OF CURRENT FRAME IS REVERSED IN SIGN WITH DIFFERENCE BETWEEN TARGET OPENING DEGREE AND CURRENT OPENING DEGREE OF RECORD OF CURRENT FRAME

DECREASE DRIVING FORCE APPLIED TO STOP FROM STOP OPENING DEGREE ADJUSTMENT MECHANISM

<CASE WHERE STOP DRIVE CONTROL IS PERFORMED ON 35TH FRAME FROM START OF ZOOM OPERATION>

④

DECREASE DRIVING FORCE APPLIED TO STOP
FROM STOP OPENING DEGREE ADJUSTMENT
MECHANISM TO SET OPENING DEGREE TO
TARGET OPENING DEGREE    ~ST315

②

DIFFERENCE BETWEEN TARGET
OPENING DEGREE AND CURRENT
OPENING DEGREE DERIVED IN
CURRENT FRAME IS THREE OR MORE

DRIVE STOP OPENING DEGREE
ADJUSTMENT MECHANISM TO
SET OPENING DEGREE TO
TARGET OPENING DEGREE

DRIVE SPEED
OF STOP

———— NORMAL DRIVE

— — — CASE WHERE OPERATION SPEED
OF ZOOM LENS IS FAST

— — — — CASE WHERE OPERATION SPEED
OF ZOOM LENS IS SLOW

TIME

STOP DRIVE CONTROL DEVICE, OPERATION METHOD OF STOP DRIVE CONTROL DEVICE, OPERATION PROGRAM OF STOP DRIVE CONTROL DEVICE, AND IMAGING APPARATUS

CROSS-REFERENCE TO RELATED APPLICATIONS

The present application claims priority under 35 U.S.C. § 119 to Japanese Patent Application No. 2023-053308 filed on Mar. 29, 2023. The above application is hereby expressly incorporated by reference, in its entirety, into the present application.

BACKGROUND

1. Technical Field

The technique of the present disclosure relates to a stop drive control device, an operation method of a stop drive control device, an operation program of a stop drive control device, and an imaging apparatus.

2. Description of the Related Art

JP2012-003083A discloses an optical device including a plurality of stop leaf blades, an opening/closing mechanism that moves the plurality of stop leaf blades in an opening/closing direction, an actuator that drives the opening/closing mechanism, and a control unit that controls drive of the actuator. In a case where the stop leaf blades are moved from a first position to a second position in video imaging, the control unit obtains an added value of a target drive amount of the actuator corresponding to a movement amount from the first position to the second position and a drive correction amount of the actuator that changes according to at least one of the first position or the second position and a movement direction of the stop leaf blades to control the drive of the actuator according to the added value.

SUMMARY

One embodiment according to the technique of the present disclosure provides a stop drive control device, an operation method of a stop drive control device, an operation program of a stop drive control device, and an imaging apparatus capable of performing appropriate stop drive in accordance with a fluctuation of a focal length of a zoom lens.

A stop drive control device according to an aspect of the present disclosure is a stop drive control device including a processor. The processor is configured to perform drive control of a stop opening degree adjustment mechanism that adjusts an opening degree of a stop, based on opening degree history information in which the opening degree of the stop is associated with a target opening degree of the stop in accordance with a fluctuation of a focal length of a zoom lens.

It is preferable that the target opening degree is a value in accordance with information regarding the focal length during an operation of the zoom lens, and the processor is configured to perform the drive control of the stop opening degree adjustment mechanism during the operation of the zoom lens based on the opening degree history information.

It is preferable that the processor is configured to perform control of associating the target opening degree with a current opening degree and storing the target opening degree and the current opening degree in a storage unit as one record of the opening degree history information.

It is preferable that the processor is configured to perform control of storing the record in the storage unit according to frames sequentially output by an imaging element.

It is preferable that the processor is configured to, in a case where records for frames set in advance tracing back from a current frame are not stored in the opening degree history information, perform the drive control based on the target opening degree and the current opening degree derived in the current frame, and in a case where records for frames set in advance tracing back from a current frame are stored in the opening degree history information, perform the drive control based on the opening degree history information.

It is preferable that the processor is configured to, in a case where there is a difference between the target opening degree and the current opening degree of the records for frames set in advance tracing back from the current frame and there is no change in the target opening degree of the records for frames set in advance tracing back from the current frame, suppress the drive of the stop opening degree adjustment mechanism.

It is preferable that the processor is configured to, in a case where there is a difference, which is equal to or less than a first threshold value set in advance, between the target opening degree and the current opening degree of the records for frames set in advance tracing back from the current frame and there is a change in the target opening degree of the records for frames set in advance tracing back from the current frame by a change amount equal to or less than a second threshold value set in advance, increase driving force applied to the stop from the stop opening degree adjustment mechanism.

It is preferable that the processor is configured to, in a case where there is a difference, which is equal to or larger than a third threshold value set in advance, between the target opening degree and the current opening degree of the records for frames set in advance tracing back from the current frame and a difference between the target opening degree and the current opening degree of the record of a previous frame of the current frame is reversed in sign with a difference between the target opening degree and the current opening degree of the record of the current frame, decrease driving force applied to the stop from the stop opening degree adjustment mechanism.

It is preferable that the processor is configured to derive a predicted value of a difference between the target opening degree and the current opening degree of a frame next to the current frame based on the opening degree history information.

It is preferable that the processor is configured to, in a case where there is a change in the target opening degree of the records for frames set in advance tracing back from the current frame by a change amount equal to or less than a fourth threshold value set in advance and a difference between the target opening degree and the current opening degree of the record of the current frame is not reversed in sign with the predicted value, increase driving force applied to the stop from the stop opening degree adjustment mechanism.

It is preferable that the processor is configured to, in a case where there is a change in the target opening degree of the records for frames set in advance tracing back from the current frame by a change amount equal to or less than a fifth threshold value set in advance and a difference between the target opening degree and the current opening degree of the record of the current frame is reversed in sign with the predicted value, decrease driving force applied to the stop from the stop opening degree adjustment mechanism.

It is preferable that the processor is configured to, in a case where a difference between the target opening degree and a current opening degree is equal to or larger than a sixth threshold value set in advance, drive the stop opening degree adjustment mechanism to set the current opening degree to the target opening degree, and in a case where the difference is less than the sixth threshold value, maintain the current opening degree without driving the stop opening degree adjustment mechanism.

It is preferable that the processor is configured to change driving force applied to the stop from the stop opening degree adjustment mechanism according to an operation speed of the zoom lens.

An imaging apparatus of the present disclosure comprises the stop drive control device described above.

An operation method of a stop drive control device according to an aspect of the present disclosure is an operation method of a stop drive control device including performing drive control of a stop opening degree adjustment mechanism that adjusts an opening degree of a stop, based on opening degree history information in which the opening degree of the stop is associated with a target opening degree of the stop in accordance with a fluctuation of a focal length of a zoom lens.

An operation program of a stop drive control device according to an aspect of the present disclosure is an operation program of a stop drive control device causing a computer to execute a process including performing drive control of a stop opening degree adjustment mechanism that adjusts an opening degree of a stop, based on opening degree history information in which the opening degree of the stop is associated with a target opening degree of the stop in accordance with a fluctuation of a focal length of a zoom lens.

BRIEF DESCRIPTION OF THE DRAWINGS

Exemplary embodiments according to the technique of the present disclosure will be described in detail based on the following figures, wherein:

FIG. 10 is a diagram showing processing in a case where records for frames set in advance tracing back from a current frame are not stored in opening degree history information;

FIG. 11 is a diagram showing processing in a case in which there is a difference between a target opening degree and a current opening degree derived in a current frame;

FIG. 14 is a diagram showing processing in a case where there is a difference between the target opening degree and the current opening degree of records for frames set in advance tracing back from a current frame and there is no change in the target opening degree of the records for frames set in advance tracing back from the current frame;

FIG. 17 is a diagram showing processing in a case where there is a difference between the target opening degree and the current opening degree of records for frames set in advance tracing back from a current frame and there is a change in the target opening degree of the records for frames set in advance tracing back from the current frame;

FIG. 19 is a flowchart showing the processing procedure of the CPU;

FIG. 20 is a diagram showing processing in a case where there is a difference, which is equal to or less than a first threshold value set in advance, between the target opening degree and the current opening degree of records for frames set in advance tracing back from a current frame and there is a change in the target opening degree of the records for frames set in advance tracing back from the current frame by a change amount equal to or less than a second threshold value set in advance;

FIG. 22 is a diagram showing processing in a case where there is a difference, which is equal to or larger than a third threshold value set in advance, between the target opening degree and the current opening degree of records for frames set in advance tracing back from a current frame and the difference between the target opening degree and the current opening degree of the record of a previous frame of the current frame is reversed in sign with the difference between the target opening degree and the current opening degree of the record of the current frame;

DETAILED DESCRIPTION

First Embodiment

Figure 1:
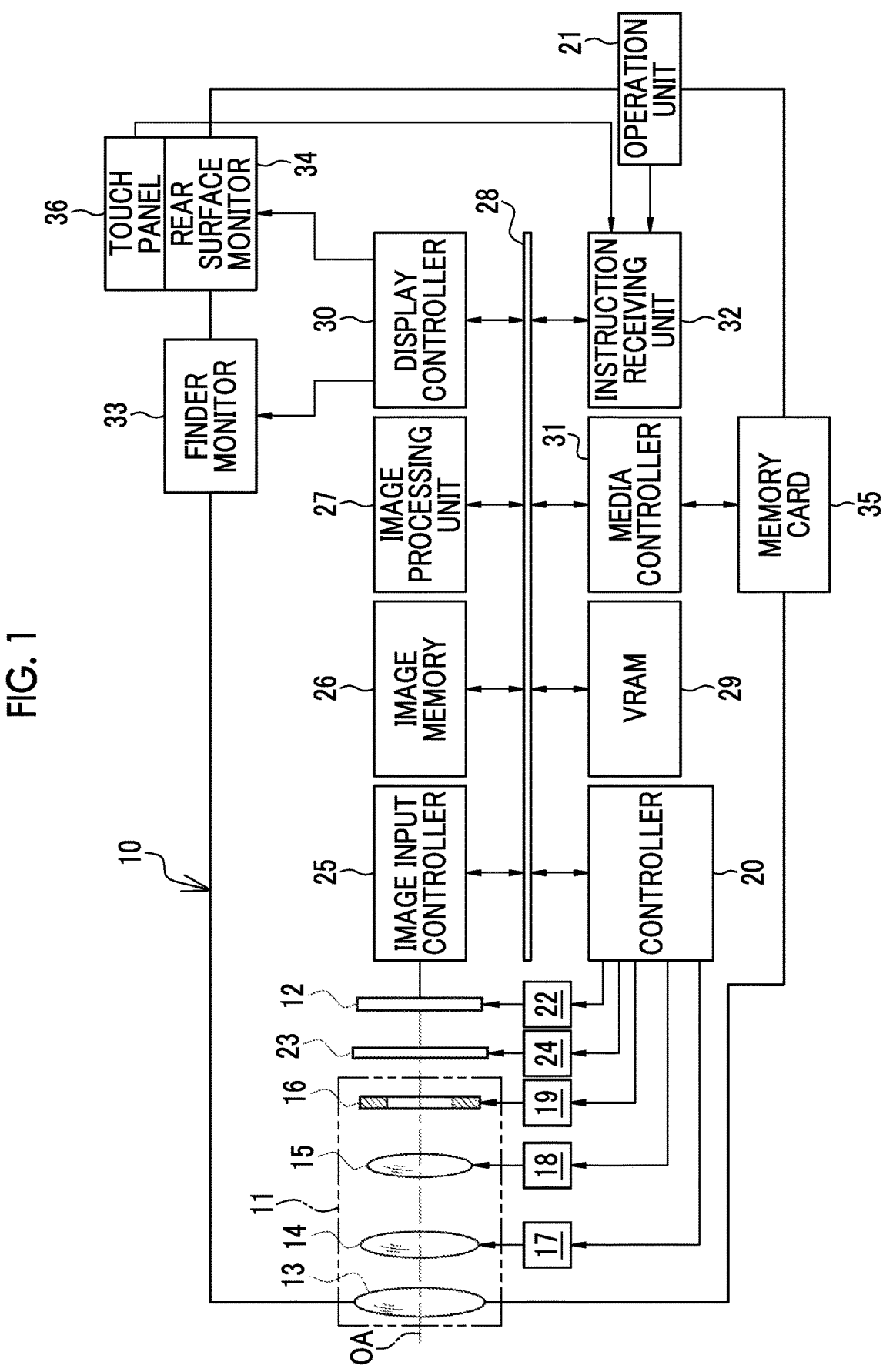
FIG. 1 is a diagram showing a configuration of an imaging apparatus.

As shown in FIG. 1 as an example, an imaging apparatus 10 is, for example, a mirrorless single-lens digital camera, and comprises an imaging optical system 11 and an imaging element 12. The imaging optical system 11 has a plurality of types of lenses for forming an image of subject light on the imaging element 12. Specifically, the imaging optical system 11 has an objective lens 13, a focus lens 14, and a zoom lens 15. Each of these lenses 13 to 15 is disposed in this order from an object side (subject side) toward an image formation side (imaging element 12 side). Although simplified in FIG. 1, each of the lenses 13 to 15 is actually a lens group in which a plurality of lenses are combined. The imaging optical system 11 also has a stop (also called aperture) 16. The stop 16 is disposed closest to the image formation side in the imaging optical system 11. The imaging apparatus 10 may be a type in which a lens barrel with built-in the imaging optical system 11 and the like is integrated with a main body with built-in the imaging element 12 and the like, or may be a so-called lens interchangeable type in which the lens barrel and the main body are separate bodies.

The focus lens 14 is provided with a focus lens driving mechanism 17, the zoom lens 15 is provided with a zoom lens driving mechanism 18, and the stop 16 is provided with a stop opening degree adjustment mechanism 19.

Figure 2:
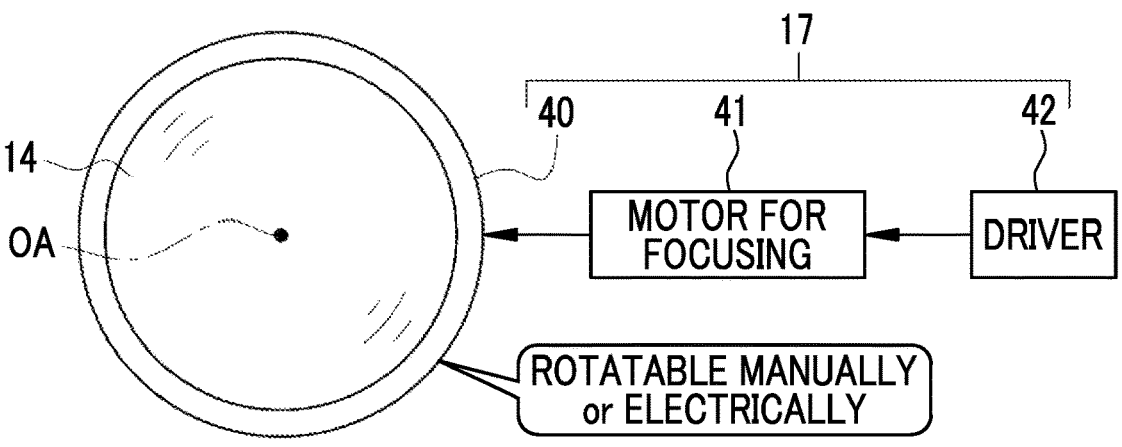
FIG. 2 is a diagram showing a focus lens and a focus lens driving mechanism.
Figure 3:
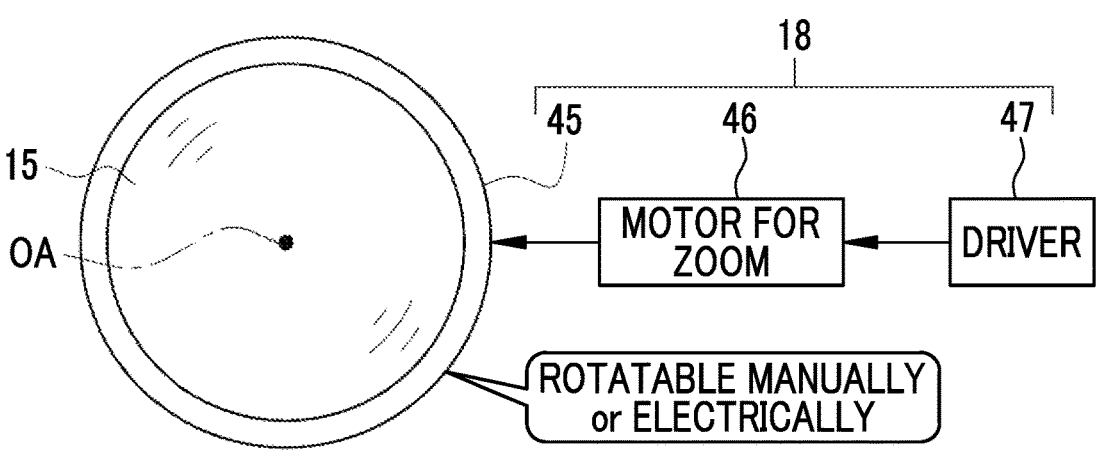
FIG. 3 is a diagram showing a zoom lens and a zoom lens driving mechanism.

As shown in FIG. 2 as an example, the focus lens driving mechanism 17 holds the focus lens 14, and includes a cam ring for focusing 40 in which a cam groove is formed on an outer periphery of the focus lens 14, a motor for focusing 41 that rotates the cam ring for focusing 40 around an optical axis OA to move the cam ring for focusing 40 along the optical axis OA, a driver 42 of the motor for focusing 41, and the like. As shown in FIG. 3 as an example, the zoom lens driving mechanism 18 holds the zoom lens 15, and includes a cam ring for zoom 45 in which a cam groove is formed on an outer periphery of the zoom lens 15, a motor for zoom 46 that rotates the cam ring for zoom 45 around the optical axis OA to move the cam ring for zoom 45 along the optical axis OA, a driver 47 of the motor for zoom 46, and the like. The cam ring for focusing 40 and the cam ring for zoom 45 can also be manually rotated by a user from an outside of the lens barrel. That is, in the imaging apparatus 10, focus adjustment and a change of a focal length can be electrically performed by the motor for focusing 41 and the motor for zoom 46, or can be manually performed by the user.

Figure 4:
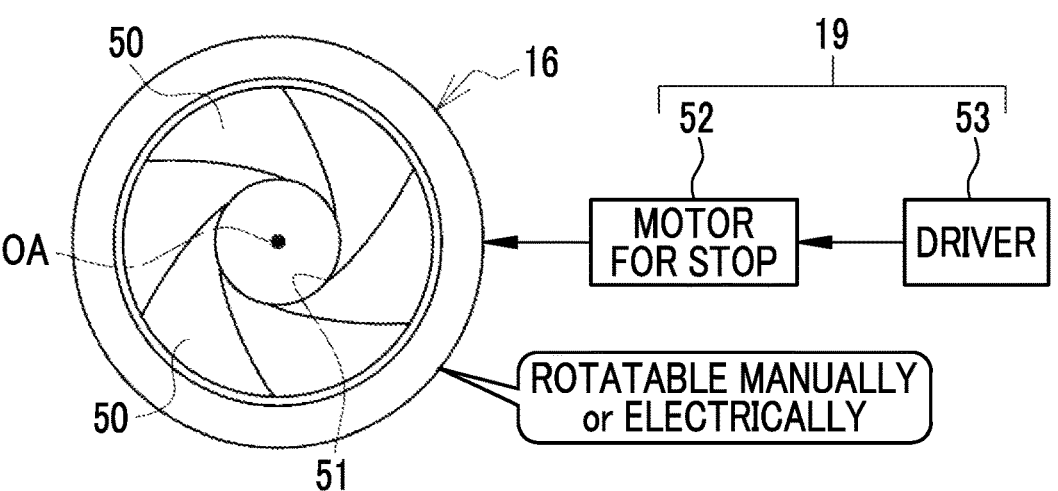
FIG. 4 is a diagram showing a stop and a stop opening degree adjustment mechanism.

As shown in FIG. 4 as an example, the stop 16 is a so-called iris stop and is configured of a combination of a plurality of stop leaf blades 50. The stop 16 opens and closes, by moving the stop leaf blades 50 at the same time by a cam mechanism (not shown), a central opening 51 formed by inner edges of the stop leaf blades 50, that is, changes an opening degree of the opening 51 (hereinafter denoted as opening degree of the stop 16) to adjust an amount of light to be passed therethrough. The stop opening degree adjustment mechanism 19 includes a motor for stop 52 that opens and closes the stop leaf blades 50, a driver 53 of the motor for stop 52, and the like. The stop 16 can be manually opened and closed by the user. That is, in the imaging apparatus 10, the opening degree of the stop 16 can be electrically adjusted by the motor for stop 52, or can be manually adjusted by the user.

The motor for focusing 41, the motor for zoom 46, and the motor for stop 52 are, for example, stepping motors. In this case, a position of the focus lens 14 and a position of the zoom lens 15 (hereinafter denoted as zoom position) on the optical axis OA and the opening degree of the stop 16 can be derived from drive amounts of the motor for focusing 41, the motor for zoom 46, and the motor for stop 52. A position sensor may be provided to detect the position of the focus lens 14 and the zoom position, instead of the drive amounts of the motor for focusing 41 and the motor for zoom 46.

Returning to FIG. 1, electric components, such as the motors (motor for focusing 41, motor for zoom 46, and motor for stop 52) or the drivers (drivers 42, 47, and 53) of the driving mechanisms 17 to 19, are connected to a controller 20. The electric component of each of the driving mechanisms 17 to 19 is driven under the control of the controller 20. More specifically, the controller 20 issues a drive signal in response to an instruction from a user, which is input via an operation unit 21, to drive the electric component of each of the driving mechanisms 17 to 19. For example, in a case where an instruction to change an angle of view to a telephoto side is input via an angle-of-view change switch of the operation unit 21, the controller 20 issues, to the driver 47 of the motor for zoom 46 of the zoom lens driving mechanism 18, the drive signal to move the zoom lens 15 to the telephoto side. Hereinafter, an operation of the angle-of-view change switch or the cam ring for zoom 45 to change the focal length of the zoom lens 15 is denoted as a zoom operation.

The motor for focusing 41, the motor for zoom 46, and the motor for stop 52 output the drive amounts to the controller 20. The controller 20 derives, from the drive amounts, the position of the focus lens 14 on the optical axis OA, the zoom position, and the opening degree of the stop 16 (refer to FIG. 7).

The imaging element 12 is, for example, a complementary metal-oxide-semiconductor (CMOS) image sensor, and has an imaging surface 62 (refer to FIG. 5) that images the subject light. The imaging element 12 is disposed such that a center of the imaging surface 62 matches the optical axis OA and the imaging surface 62 is orthogonal to the optical axis OA. The terms "match" and "orthogonal" as used herein mean not only perfect match and orthogonality but also match and orthogonality in a sense including an error generally allowed in the technical field to which the technique of the present disclosure belongs.

An imaging element driver 22 is connected to the imaging element 12. The imaging element driver 22 is connected to the controller 20. The imaging element driver 22 performs, under the control of the controller 20, supplying of a vertical scanning signal and a horizontal scanning signal to the imaging element 12, or the like to control an imaging timing of the subject light by the imaging element 12.

A shutter 23 is provided between the imaging optical system 11 and the imaging element 12. The shutter 23 is, for example, a focal-plane shutter having a front curtain and a rear curtain. A shutter driving mechanism 24 is connected to the shutter 23. The shutter driving mechanism 24 includes an electromagnet that holds the front curtain and the rear curtain and releases the holding thereof to cause the front curtain and the rear curtain to travel, a driver of the electromagnet, and the like. The shutter driving mechanism 24 is driven to open and close the shutter 23 under the control of the controller 20.

The controller 20 is connected to each unit such as an image input controller 25, an image memory 26, and an image processing unit 27, through a busline 28. In addition, the busline 28 is connected to a video random access memory (VRAM) 29, a display controller 30, a media controller 31, an instruction receiving unit 32, and the like.

Although not shown, the busline 28 is also connected to a strobe driving controller that controls the drive of a strobe device, an external communication interface (I/F) for communicating with an external device via a connection terminal such as a universal serial bus (USB) terminal or a wireless communication I/F, and the like.

Image data obtained by imaging the subject light is input to the image input controller 25 from the imaging element 12. The image input controller 25 outputs the image data to the image memory 26. The image memory 26 is, for example, a synchronous dynamic random access memory (SDRAM), and temporarily stores the image data.

The image processing unit 27 reads out unprocessed image data from the image memory 26. The image processing unit 27 performs various types of image processing on the image data. The various types of image processing are, for example, offset correction processing, sensitivity correction processing, pixel interpolation processing, white balance correction processing, gamma correction processing, demosaicing, brightness signal and color difference signal generation processing, contour enhancement processing, and color correction processing. The image processing unit 27 writes the image data subjected to the various types of image processing back to the image memory 26.

The image data that is subjected to the various types of image processing and is displayed as a live view image (also referred to as through-image) is input into the VRAM 29 from the image memory 26. The VRAM 29 has a region in which the image data for two consecutive frames is stored. The image data stored in the VRAM 29 is sequentially rewritten to new image data. The VRAM 29 sequentially outputs, to the display controller 30, newer image data of the image data for two consecutive frames.

The display controller 30 has a so-called video encoder function of converting the image data from the VRAM 29 into video data and outputting the video data to any one of a finder monitor 33 or a rear surface monitor 34. Accordingly, the user can visually recognize the live view image through any one of the finder monitor 33 or the rear surface monitor 34. A display frame rate of the live view image is, for example, 60 frames per second (fps).

Which one of the finder monitor 33 and the rear surface monitor 34 the video data is output to is decided as follows, for example. That is, a pupil detection sensor is provided in a finder. In a case where the pupil detection sensor detects that the user looks into the finder, the video data is output to the finder monitor 33. On the contrary, in a case where the pupil detection sensor detects that the user does not look into the finder, the video data is output to the rear surface monitor 34.

In a case where an instruction to start capturing a static image or a video is issued via a fully push-operated release button of the operation unit 21, the image processing unit 27 performs compression processing on the image data of the image memory 26. In a case of the static image, the image processing unit 27 performs, for example, the compression processing of a joint photographic experts group (JPEG) format on the image data. In a case of the video, the image processing unit 27 performs, for example, the compression processing of a moving picture experts group (MPEG) format on the image data. The image processing unit 27 outputs, to the media controller 31, the image data subjected to the compression processing.

The media controller 31 records, in a memory card 35, the image data subjected to the compression processing from the image processing unit 27. The memory card 35 is attachably and detachably mounted in a memory card slot (not illustrated).

In a case where an image playback mode is selected via a mode selector switch of the operation unit 21, the media controller 31 reads out the image data from the memory card 35 to output the image data to the image processing unit 27. The image processing unit 27 performs expansion processing on image data from the memory card 35. The image data subjected to the expansion processing is output to the display controller 30. The display controller 30 converts the image data into the video data and outputs the video data to the rear surface monitor 34. Accordingly, the user can visually recognize a reproduction image through the rear surface monitor 34.

The instruction receiving unit 32 receives various operation instructions input from the user via a touch panel 36 that is integrally provided with the operation unit 21 and the rear surface monitor 34. The instruction receiving unit 32 outputs the received various operation instructions to the controller 20 through the busline 28.

As described above, the operation unit 21 includes the angle-of-view change switch, the release button, and the mode selector switch. In the zoom operation by the angle-of-view change switch, an operation speed (movement speed) of the zoom lens 15 can be set to be switched, for example, in three stages of high, medium, and low. The release button is a two-stage push button capable of performing a half push operation and a full push operation. An instruction to prepare capturing of a static image or a video is issued by a half push operation of the release button, and the instruction to start capturing a static image or a video is issued by the full push operation of the release button. In addition to these switches, the operation unit 21 further includes a menu button for displaying various setting menus on the rear surface monitor 34, a cross key used for numerical value setting, switching of options, and the like, and a confirmation button that is operated in a case of setting confirmation and the like. The touch panel 36 is superimposed on a display surface of the rear surface monitor 34. The touch panel 36 detects contact with a finger of the user or a dedicated indicator such as a stylus pen to recognize the various operation instructions from the user.

The modes that can be switched by the mode selector switch include a static-image capturing mode, a video imaging mode, an image playback mode, a setting mode, and the like. The static-image capturing mode includes not only a normal capturing mode in which one static image is captured but also a continuous capturing mode in which static images are continuously captured at a predetermined capturing interval (for example, frame rate of 5 fps to 10 fps). The continuous capturing mode is activated, for example, in a case where a full push state of the release button continues for a predetermined time or longer (for example, one second or longer). The continuous capturing mode ends in a case where the full push state of the release button is released.

Figure 5:
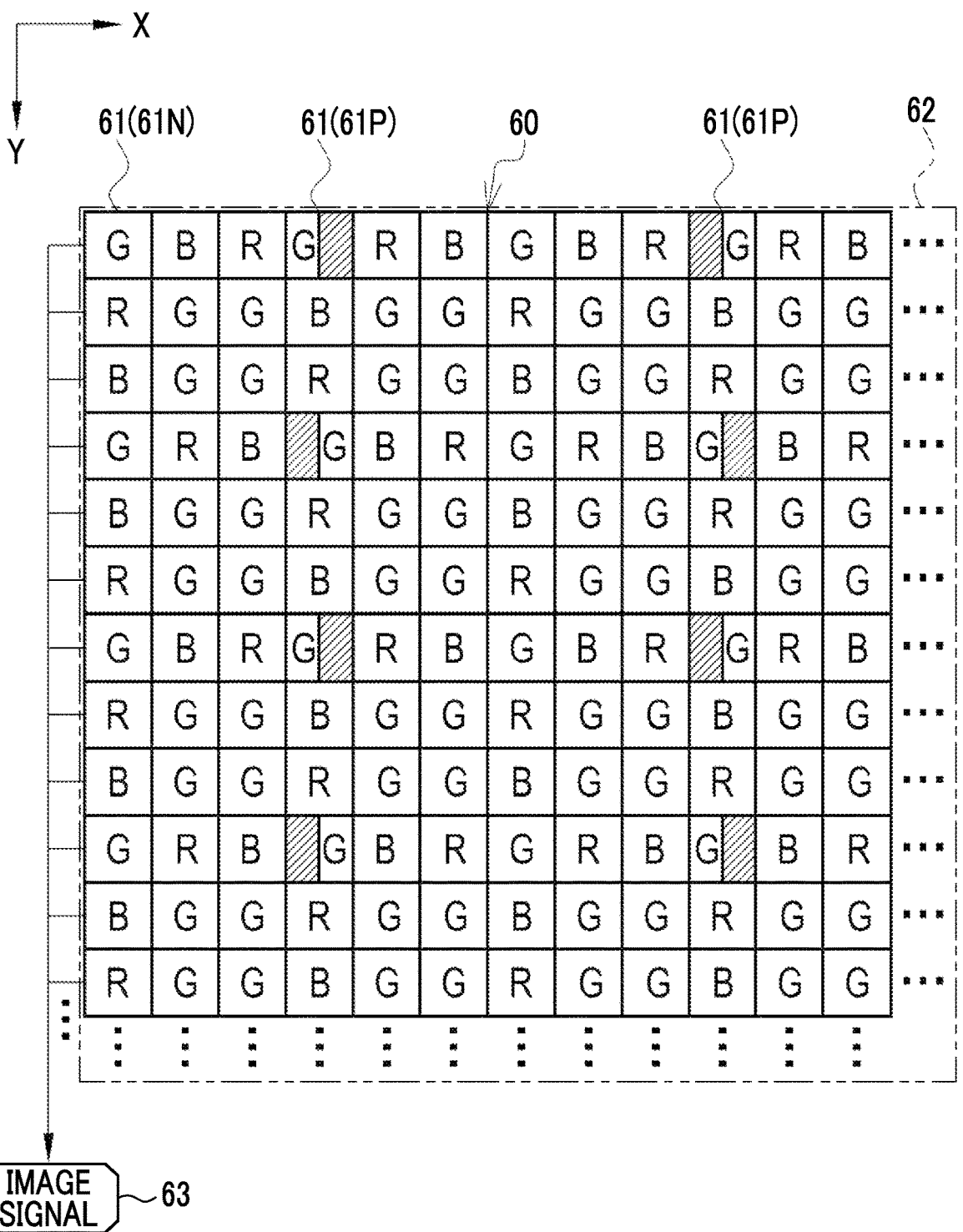
FIG. 5 is a diagram showing an arrangement of pixels of an imaging element.

As shown in FIG. 5 as an example, the imaging element 12 is provided with a photoelectric conversion unit 60. The photoelectric conversion unit 60 is configured of a plurality of pixels 61 two-dimensionally arranged along an X direction and a Y direction. The plurality of pixels 61 form the imaging surface 62. As is well known, the pixel 61 is configured of a micro lens, a color filter, and a photoelectric conversion element such as a photodiode. The X direction and the Y direction are a horizontal direction and a vertical direction in a state where a bottom surface of the imaging apparatus 10 is placed on a horizontal plane.

Scanning lines parallel to the X direction are wired between rows of the pixels 61. Further, signal lines parallel to the Y direction are wired between columns of the pixels 61. (The photoelectric conversion element of) the pixel 61 is connected to the signal line via an amplifier and a switch. The scanning line is also connected to the switch. In a case of the accumulation operation that accumulates a signal charge corresponding to the subject light in (the photoelectric conversion element of) the pixel 61, an off signal is supplied as the vertical scanning signal through the scanning line to turn off the switch. In a case of the readout operation that reads out an image signal (voltage signal) 63 corresponding to the signal charge from (the photoelectric conversion element of) the pixel 61, an on signal is supplied as the vertical scanning signal through the scanning line to turn on the switch. An end of the signal line is connected to a correlated double sampling (CDS) circuit and an analog to digital converter (ADC) circuit. The CDS circuit performs sampling two correlation pile on an image signal 63 input through the signal line. The ADC circuit converts the image signal 63 subjected to the sampling two correlation pile into a digital image signal 63. The digital image signal 63 is stored in the image memory 26 as the image data.

The pixels 61 are divided, depending on types of the color filter, into three types of a green pixel (denoted as "G" in FIG. 5) having sensitivity to light in a green wavelength range, a red pixel (denoted as "R" in FIG. 5) having sensitivity to light in a red wavelength range, and a blue pixel (denoted as "B" in FIG. 5) having sensitivity to light in a blue wavelength range. The three types of the pixels 61 are regularly arranged in a predetermined array. As the predetermined array, a so-called Bayer array is exemplified in which two green pixels, one blue pixel, and one red pixel are arranged in vertical and horizontal 2×2 pixels.

The pixel 61 includes a normal pixel 61N and a phase difference detection pixel 61P. As is well known, the phase difference detection pixel 61P is a pixel in which a light shielding member is disposed between the color filter and the photoelectric conversion element, and is a pixel dedicated to automatic focus adjustment. In the automatic focus adjustment, a phase difference of the subject light is detected based on the image signal 63 output from the phase difference detection pixel 61P. With the phase difference, it is possible to know a movement direction and amount of the focus lens 14 to obtain a focusing position. In the automatic focus adjustment, the focusing position of the focus lens 14 is calculated based on the phase difference, and the focus lens 14 is automatically moved to the calculated focusing position.

Here, the so-called automatic focus adjustment function of phase difference detection type has been described as an example, but the present disclosure is not limited thereto. Instead of or in addition to the automatic focus adjustment function of phase difference detection type, an automatic focus adjustment function of contrast detection type may be employed. Further, an imaging element may be used in which one pixel 61 is configured of two photoelectric conversion elements and the one pixel 61 serves as the normal pixel 61N and the phase difference detection pixel 61P.

The image signal 63 output from the normal pixel 61N is used to generate an image such as the live view image. On the contrary, the image signal 63 output from the phase difference detection pixel 61P is used only for detecting the phase difference and is not used to generate the image. For this reason, in the pixel interpolation processing, the image processing unit 27 interpolates a pixel value of the phase difference detection pixel 61P by using the image signal 63 of the normal pixel 61N around the phase difference detection pixel 61P.

Figure 6:
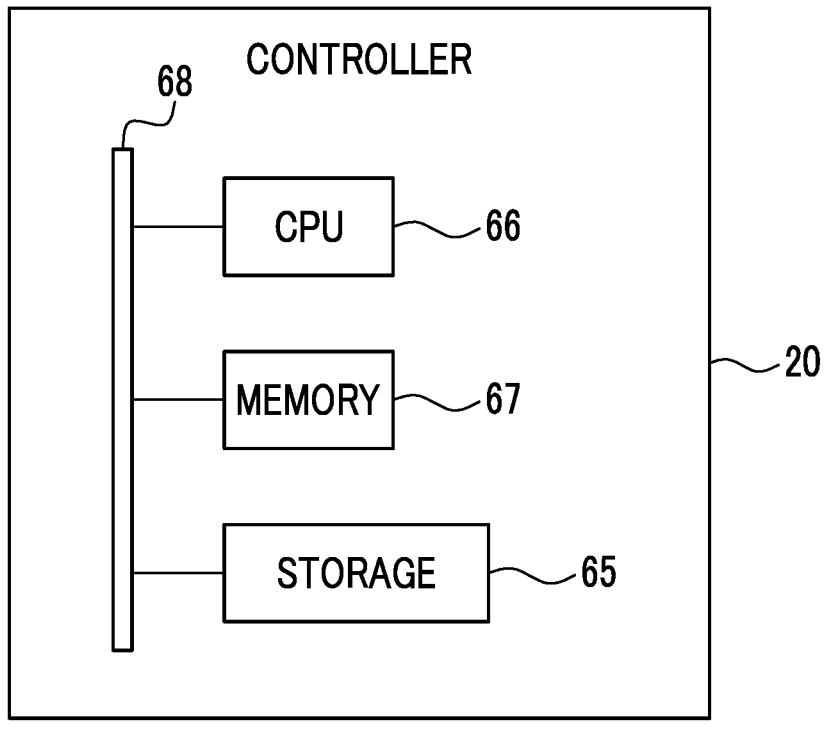
FIG. 6 is a diagram showing a detailed configuration of a controller.

As shown in FIG. 6 as an example, the controller 20 comprises a storage 65, a central processing unit (CPU) 66, and a memory 67. The storage 65, the CPU 66, and the memory 67 are connected to each other via a busline 68. The controller 20 is an example of "stop drive control device" and "computer" according to the technique of the present disclosure.

The storage 65 is a non-volatile storage device such as an electrically erasable programmable read-only memory (EE-PROM). The storage 65 stores various programs, various types of data associated with the various programs, and the like. The storage 65 is an example of "storage unit" according to the technique of the present disclosure. Instead of the EEPROM, a ferroelectric random access memory (FeRAM) or a magnetoresistive random access memory (MRAM) may be used as the storage 65.

The memory 67 is a work memory for the CPU 66 to execute the processing. The CPU 66 loads the program stored in the storage 65 into the memory 67 to execute the processing according to the program. With the above, the CPU 66 controls each unit of the imaging apparatus 10 in an integrated manner. The CPU 66 is an example of "processor" according to the technique of the present disclosure. The memory 67 may be built into the CPU 66.

Figure 7:
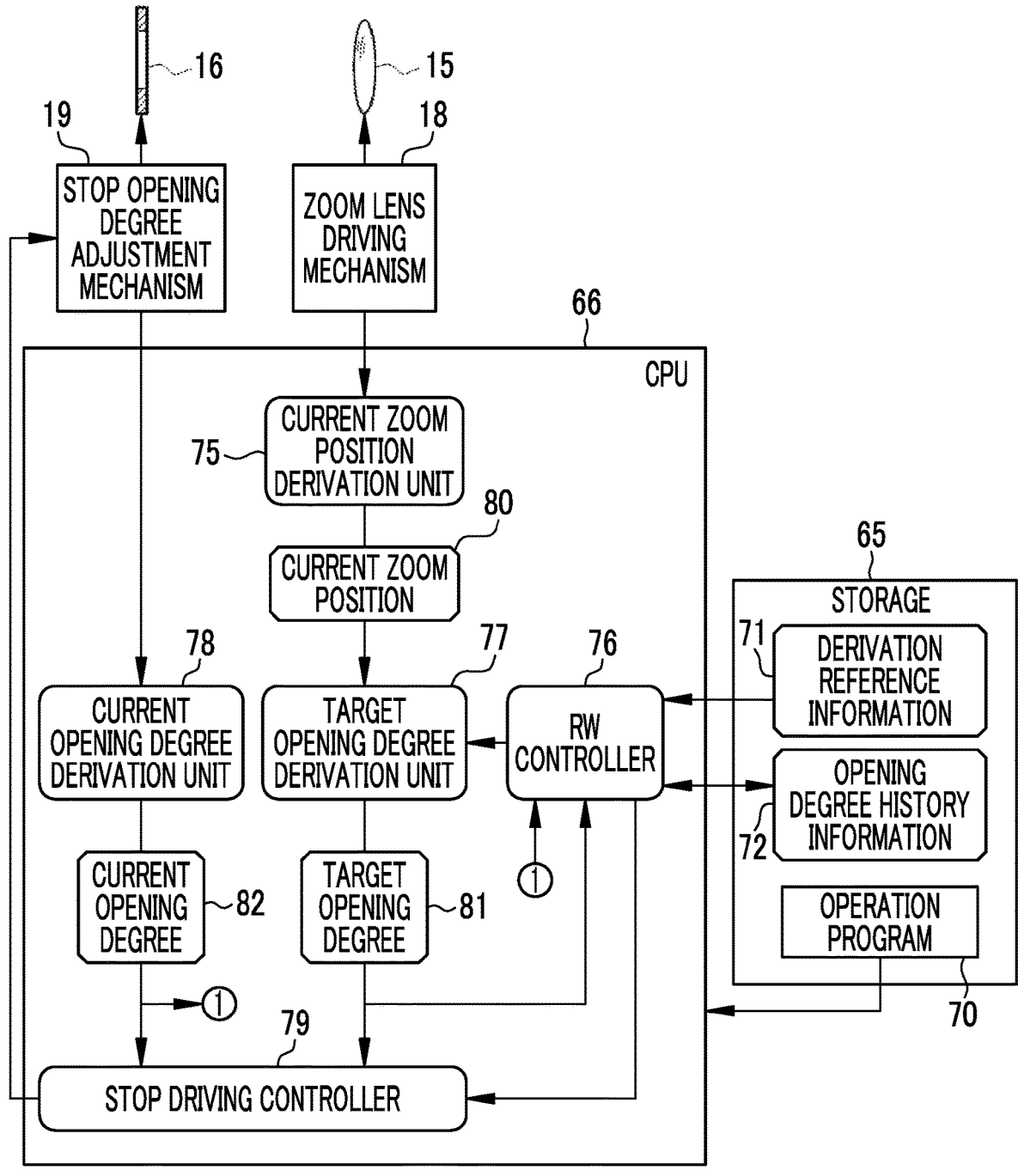
FIG. 7 is a block diagram showing a processing unit of a CPU.

As shown in FIG. 7 as an example, an operation program 70 is stored in the storage 65. The operation program 70 is a program causing the CPU 66 to execute drive control of the stop 16 and the like. That is, the operation program 70 is an example of "operation program of stop drive control device" according to the technique of the present disclosure. In the storage 65, derivation reference information 71 and opening degree history information 72 are also stored, in addition to the operation program 70.

In a case where the operation program 70 is started, the CPU 66 cooperates with the memory 67 and the like to function as a current zoom position derivation unit 75, a read/write (hereinafter denoted as RW) controller 76, a target opening degree derivation unit 77, a current opening degree derivation unit 78, and a stop driving controller 79.

The current zoom position derivation unit 75 derives a current zoom position (hereinafter denoted as current zoom position) 80 based on the drive amount of the motor for zoom 46 from the zoom lens driving mechanism 18. The current zoom position derivation unit 75 outputs the current zoom position 80 to the target opening degree derivation unit 77. The current zoom position 80 is an example of "information regarding focal length during the operation of the zoom lens" according to the technique of the present disclosure. Instead of the current zoom position 80, the drive amount of the motor for zoom 46, the focal length itself of the zoom lens 15, or the like may be acquired as "information regarding focal length during the operation of the zoom lens".

The RW controller 76 controls the storage of various types of data in the storage 65 and the reading out of various types of data stored in the storage 65. The RW controller 76 reads out the derivation reference information 71 from the storage 65, and outputs the readout derivation reference information 71 to the target opening degree derivation unit 77. Further, the RW controller 76 reads out the opening degree history information 72 from the storage 65, and outputs the read-out opening degree history information 72 to the stop driving controller 79.

The target opening degree derivation unit 77 derives a target opening degree (hereinafter denoted as target opening degree) 81 of the stop 16 according to the current zoom position 80 based on the derivation reference information 71. The target opening degree derivation unit 77 outputs the target opening degree 81 to the RW controller 76 and the stop driving controller 79.

The current opening degree derivation unit 78 derives a current opening degree (hereinafter denoted as current opening degree) 82 of the stop 16 based on the drive amount of the motor for stop 52 from the stop opening degree adjustment mechanism 19. The current opening degree derivation unit 78 outputs the current opening degree 82 to the RW controller 76 and the stop driving controller 79.

The stop driving controller 79 performs drive control of the stop opening degree adjustment mechanism 19 during the operation of the zoom lens 15 based on the opening degree history information 72, or the target opening degree 81 and the current opening degree 82.

Figures 8, 9:
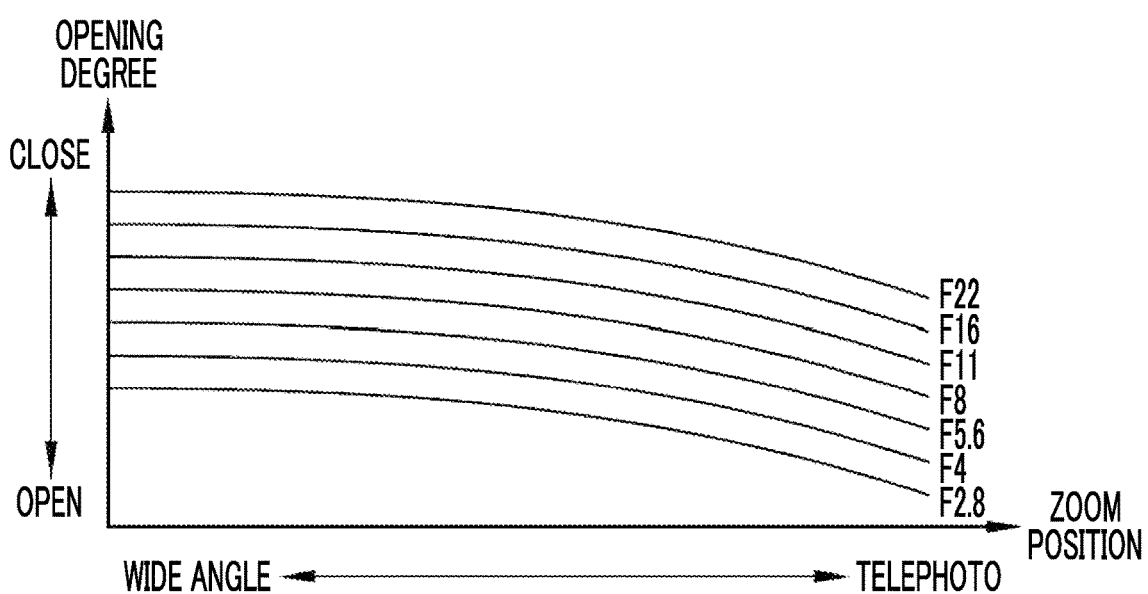
FIG. 8 is a graph showing a relationship between a zoom position and an opening degree.
FIG. 9 is a diagram showing processing of an RW controller.

As shown in FIG. 8 as an example, the opening degree of the stop 16 for maintaining an F-number (image brightness) constant differs depending on a fluctuation of the zoom position, that is, a fluctuation of the focal length of the zoom lens 15. For this reason, in order to maintain the image brightness constant, it is necessary to adjust the opening degree of the stop 16 according to the fluctuation of the focal length of the zoom lens 15. Here, the opening degree of the stop 16 for maintaining the image brightness constant is nothing but the target opening degree 81. The derivation reference information 71 has a relationship between the zoom position shown in FIG. 8 and the opening degree of the stop 16 in a form of a data table or a function for each F-number.

As shown in FIG. 9 as an example, the RW controller 76 performs, during a period from a start to an end of one zoom operation, control of storing the target opening degree 81 and the current opening degree 82 in association with each other in the storage 65, as one record 85 of the opening degree history information 72, for each frame sequentially output by the imaging element 12. The RW controller 76 assigns the same frame No. to the target opening degree 81 and the current opening degree 82 derived in the same frame to associate the target opening degree 81 with the current opening degree 82. FIG. 9 exemplifies a state in which the target opening degree 81 and the current opening degree 82 derived in a fifth frame from the start of the zoom operation are assigned with a common frame No. 5 and stored in the opening degree history information 72. The target opening degree 81 and the current opening degree 82 may be stored at predetermined intervals, such as every other frame or every two frames, instead of every frame.

Figure 12:
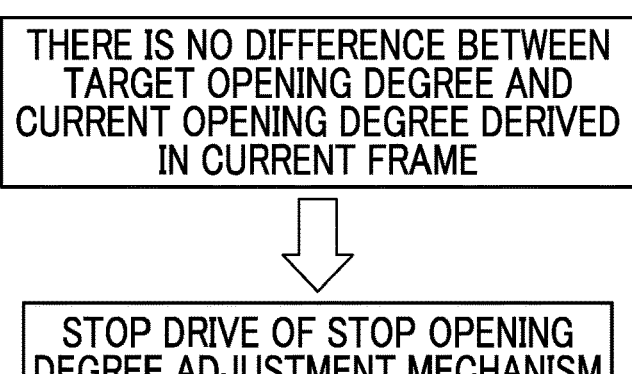
FIG. 12 is a diagram showing processing in a case in which there is no difference between a target opening degree and a current opening degree derived in a current frame.

As shown in FIG. 10 as an example, in a case where the records 85 for five frames tracing back from a current frame are not stored in the opening degree history information 72, the stop driving controller 79 performs the drive control of the stop opening degree adjustment mechanism 19 based on the target opening degree 81 and the current opening degree 82 derived in the current frame as shown in FIGS. 11 and 12 as an example. Here, the five frames are an example of "frame set in advance" according to the technique of the present disclosure. FIG. 10 exemplifies a case where the current frame is a fourth frame from the start of the zoom operation and only the records 85 for three frames are stored in the opening degree history information 72.

As shown in FIG. 11, in a case where there is a difference between the target opening degree 81 and the current opening degree 82 derived in the current frame, in other words, in a case where the target opening degree 81 is different from the current opening degree 82, the stop driving controller 79 drives the stop opening degree adjustment mechanism 19 to set the opening degree of the stop 16 to the target opening degree 81 before imaging of a next frame. On the other hand, as shown in FIG. 12, in a case where there is no difference between the target opening degree 81 and the current opening degree 82 derived in the current frame, in other words, in a case where the target opening degree 81 is equal to the current opening degree 82, the stop driving controller 79 stops the drive of the stop opening degree adjustment mechanism 19.

Figure 13:
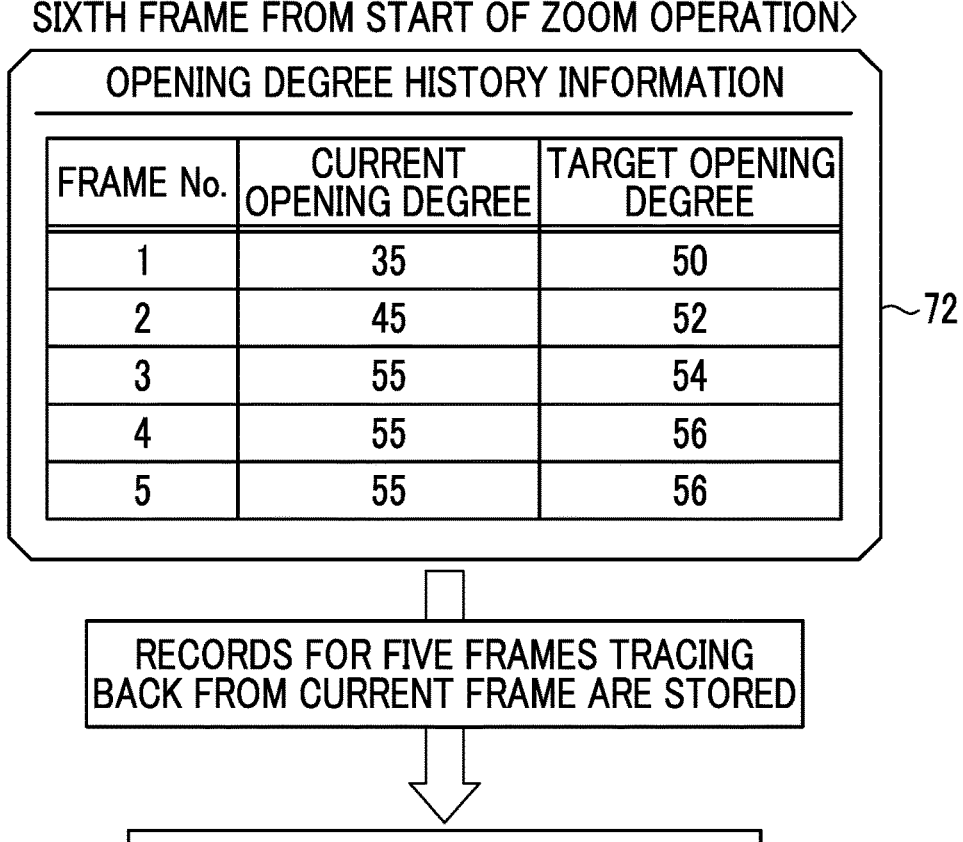
FIG. 13 is a diagram showing processing in a case where records for frames set in advance tracing back from a current frame are stored in the opening degree history information.

As shown in FIG. 13 as an example, in a case where the records 85 for five frames tracing back from the current frame are stored in the opening degree history information 72, the stop driving controller 79 performs the drive control of the stop opening degree adjustment mechanism 19 based on the opening degree history information 72 as shown in FIGS. 14 and 17 as an example. FIG. 13 exemplifies a case where the current frame is a sixth frame from the start of the zoom operation and the records 85 for five frames are stored in the opening degree history information 72.

As shown in FIG. 14 as an example, in a case where there is a difference between the target opening degree 81 and the current opening degree 82 of the records 85 for five frames tracing back from the current frame and there is no change in the target opening degree 81 of the records 85 for five frames tracing back from the current frame, the stop driving controller 79 suppresses the drive of the stop opening degree adjustment mechanism 19. Specifically, the stop driving controller 79 stops the drive of the stop opening degree adjustment mechanism 19. The reason why there is no change in the target opening degree 81 of the records 85 for five frames tracing back from the current frame is considered that a speed of the zoom operation is relatively slow. FIG. 14 exemplifies a case where the current frame is a 35th frame from the start of the zoom operation, the target opening degree 81 of all the records 85 of 30 to 34 frames is "50", and the current opening degree 82 thereof is "48". Instead of stopping the drive of the stop opening degree adjustment mechanism 19, driving force applied to the stop 16 from the stop opening degree adjustment mechanism 19 may be decreased to suppress the drive of the stop opening degree adjustment mechanism 19.

Figure 15:
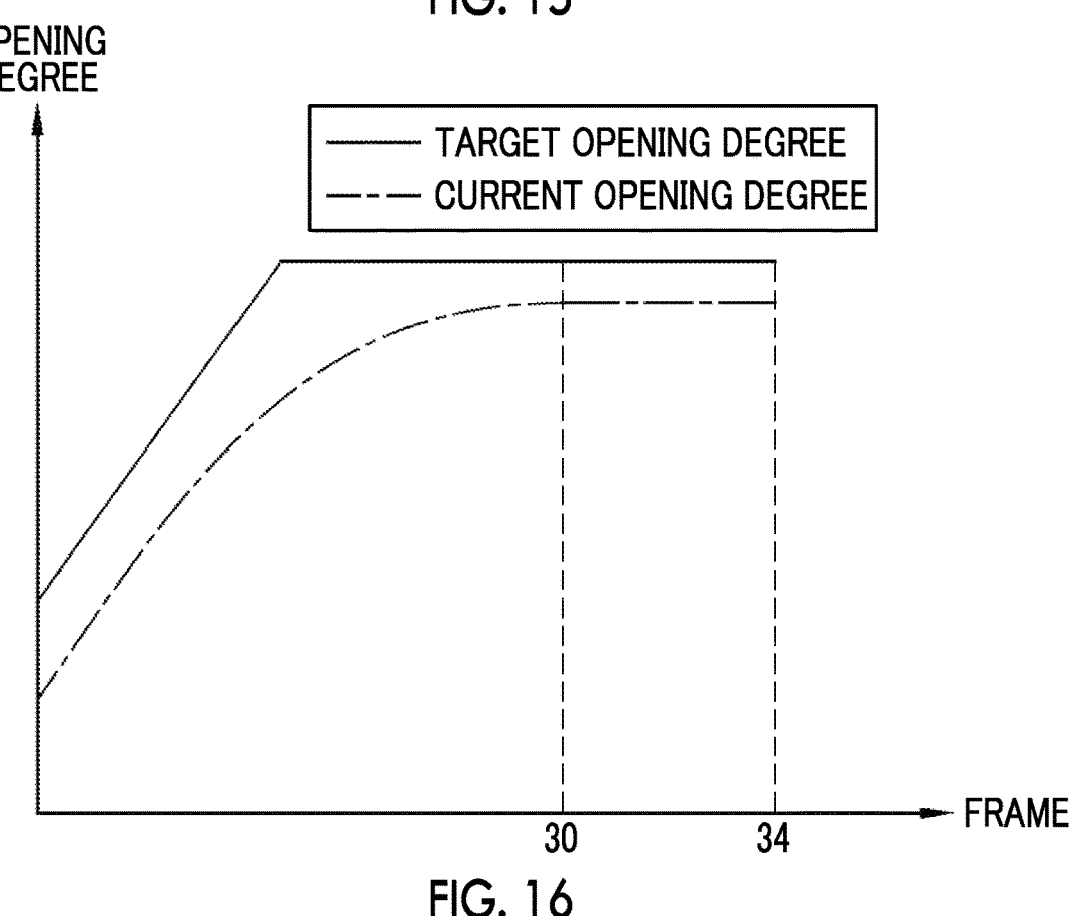
FIG. 15 is a graph showing an example of a situation in which there is a difference between the target opening degree and the current opening degree of records for frames set in advance tracing back from a current frame and there is no change in the target opening degree of the records for frames set in advance tracing back from the current frame.

The situation in which there is a difference between the target opening degree 81 and the current opening degree 82 of the records 85 for five frames tracing back from the current frame and there is no change in the target opening degree 81 of the records 85 for five frames tracing back from the current frame is considered as a situation such as a graph shown in FIG. 15 as an example, in which a horizontal axis is the frame and a vertical axis is the opening degree. That is, the situation includes a situation in which the stop 16 continues to stop at an opening degree one step lower than the target opening degree 81 that is constant due to the relatively slow speed of the zoom operation, even though the stop opening degree adjustment mechanism 19 is driven. The reason for such a situation is considered that stop accuracy of the stop 16 is not very good due to a heavy weight of the stop leaf blades 50 or the like, or the driving force applied to the stop 16 from the stop opening degree adjustment mechanism 19 is excessively small. The situation in which there is a difference between the target opening degree 81 and the current opening degree 82 of the records 85 for five frames tracing back from the current frame and there is no change in the target opening degree 81 of the records 85 for five frames tracing back from the current frame is considered as a situation in which the stop 16 continues to stop at an opening degree one step higher than the target opening degree 81 that is constant due to the relatively slow speed of the zoom operation, even though the stop opening degree adjustment mechanism 19 is driven, such as a graph shown in FIG. 16 as an example.

As shown in FIG. 17 as an example, in a case where there is a difference between the target opening degree 81 and the current opening degree 82 of the records 85 for five frames tracing back from the current frame, but there is a change in the target opening degree 81 of the records 85 for five frames tracing back from the current frame, the stop driving controller 79 performs the drive control of the stop opening degree adjustment mechanism 19 based on the target opening degree 81 and the current opening degree 82 derived in the current frame, as in the case where the records 85 for five frames tracing back from the current frame are not stored in the opening degree history information 72. FIG. 17 exemplifies a case where the current frame is a 50th frame from the start of the zoom operation and the target opening degree 81 of the records 85 of 45 to 49 frames is changed from "50" to "55".

In a case where the zoom lens 15 is not in operation, the stop driving controller 79 performs the drive control of the stop opening degree adjustment mechanism 19 as follows. First, in a case where an exposure mode is an aperture stop priority and a manual setting, the stop driving controller 79 drives the stop opening degree adjustment mechanism 19 such that the opening degree of the stop 16 becomes a set opening degree. On the other hand, in a case where the exposure mode is not the aperture stop priority and the manual setting, for example, in a case where the exposure mode is a shutter speed priority, the stop driving controller 79 drives the stop opening degree adjustment mechanism 19 to set the opening degree of the stop 16 to obtain appropriate exposure in accordance with a set shutter speed. Further, in a case where the exposure mode is an auto setting, the stop driving controller 79 drives the stop opening degree adjustment mechanism 19 to set the opening degree of the stop 16 to obtain appropriate exposure in accordance with brightness of a subject.

Figure 18:
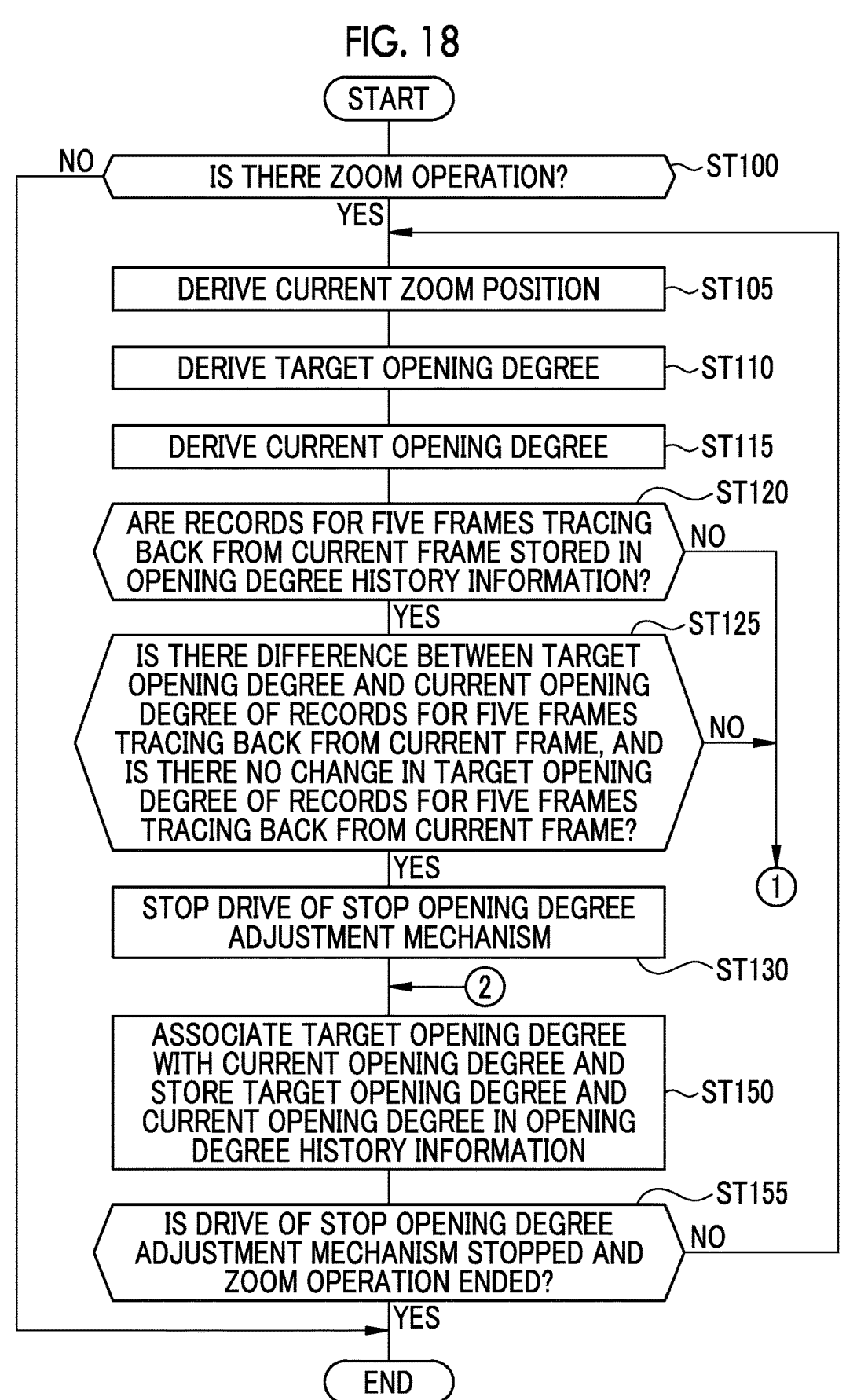
FIG. 18 is a flowchart showing a processing procedure of a CPU.

Next, an action of the above configuration will be described with reference to flowcharts shown in FIGS. 18 and 19 as an example. As shown in FIG. 7, with the start of the operation program 70, the CPU 66 of the controller 20 functions as the current zoom position derivation unit 75, the RW controller 76, the target opening degree derivation unit 77, the current opening degree derivation unit 78, and the stop driving controller 79.

In a case where the user operates the angle-of-view change switch of the operation unit 21 or the cam ring for zoom 45, that is, in a case where the zoom operation is performed (YES in step ST100), the current zoom position derivation unit 75 derives the current zoom position 80 from the drive amount of the motor for zoom 46 (step ST105). The current zoom position 80 is output from the current zoom position derivation unit 75 to the target opening degree derivation unit 77.

Next, the target opening degree derivation unit 77 derives the target opening degree 81 in accordance with the current zoom position 80 based on the derivation reference information 71 (step ST110). The target opening degree 81 is output from the target opening degree derivation unit 77 to the RW controller 76 and the stop driving controller 79.

Further, the current opening degree derivation unit 78 derives the current opening degree 82 from the drive amount of the motor for stop 52 (step ST115). The current opening degree 82 is output from the current opening degree derivation unit 78 to the RW controller 76 and the stop driving controller 79.

As shown in FIG. 13, in a case where the records 85 for five frames tracing back from the current frame are stored in the opening degree history information 72 (YES in step ST120), the processing proceeds to step ST125. On the other hand, as shown in FIG. 10, in a case where the records 85 for five frames tracing back from the current frame are not stored in the opening degree history information 72 (NO in step ST120), the processing proceeds to step ST135 in FIG. 19.

In step ST125, the stop driving controller 79 determines whether or not there is a difference between the target opening degree 81 and the current opening degree 82 of the records 85 for five frames tracing back from the current frame and there is no change in the target opening degree 81 of the records 85 for five frames tracing back from the current frame. In a case where there is a difference between the target opening degree 81 and the current opening degree 82 of the records 85 for five frames tracing back from the current frame and there is no change in the target opening degree 81 of the records 85 for five frames tracing back from the current frame (YES in step ST125), the stop driving controller 79 stops the drive of the stop opening degree adjustment mechanism 19 as shown in FIG. 14 (step ST130). On the other hand, as shown in FIG. 17, in a case where there is a difference between the target opening degree 81 and the current opening degree 82 of the records 85 for five frames tracing back from the current frame, but there is a change in the target opening degree 81 of the records 85 for five frames tracing back from the current frame (NO in step ST125), the processing proceeds to step ST135 in FIG. 19.

In step ST135, the stop driving controller 79 determines whether or not there is a difference between the target opening degree 81 and the current opening degree 82 derived in the current frame. In a case where there is a difference between the target opening degree 81 and the current opening degree 82 derived in the current frame (YES in step ST135), the stop driving controller 79 drives the stop opening degree adjustment mechanism 19 to set the opening degree of the stop 16 to the target opening degree 81 as shown in FIG. 11 (step ST140). On the other hand, in a case where there is no difference between the target opening degree 81 and the current opening degree 82 derived in the current frame (NO in step ST135), the stop driving controller 79 stops the drive of the stop opening degree adjustment mechanism 19 as shown in FIG. 12 (step ST145).

After the drive control of the stop opening degree adjustment mechanism 19 ends, the target opening degree 81 and the current opening degree 82 are associated with each other as one record 85 by the RW controller 76, and are stored in the opening degree history information 72 as shown in FIG. 9 (step ST150). A series of pieces of processing of steps ST105 to ST150 continues to be repeated until the drive of the stop opening degree adjustment mechanism 19 is stopped and the zoom operation is not ended (NO in step ST155).

As described above, the CPU 66 of the controller 20 of the imaging apparatus 10 comprises the stop driving controller 79. The stop driving controller 79 performs the drive control of the stop opening degree adjustment mechanism 19 based on the opening degree history information 72 in which the current opening degree 82 is associated with the target opening degree 81 in accordance with the fluctuation of the focal length of the zoom lens 15. There, it is possible to perform appropriate stop drive in accordance with the fluctuation of the focal length of the zoom lens 15.

The target opening degree 81 is a value in accordance with the current zoom position 80 which is the information regarding the focal length of the zoom lens 15 during the operation. The stop driving controller 79 performs the drive control of the stop opening degree adjustment mechanism 19 during the operation of the zoom lens 15 based on the opening degree history information 72. Therefore, it is possible to perform appropriate stop drive in accordance with the fluctuation of the focal length of the zoom lens 15 during the operation.

As shown in FIG. 9, the RW controller 76 performs the control of associating the target opening degree 81 with the current opening degree 82 and storing the target opening degree 81 and the current opening degree 82 in the storage 65 as one record 85 of the opening degree history information 72. Therefore, it is possible to easily obtain the opening degree history information 72. Further, the RW controller 76 performs the control of storing the record 85 in the storage 65 according to the frames sequentially output by the imaging element 12. Therefore, it is possible to obtain the records 85 having the same interval such as the record 85 for each frame and to easily understand a temporal transition between the target opening degree 81 and the current opening degree 82.

As shown in FIGS. 10 to 12, in a case where the records 85 for frames set in advance tracing back from the current frame are not stored in the opening degree history information 72, the stop driving controller 79 performs the drive control of the stop opening degree adjustment mechanism 19 based on the target opening degree 81 and the current opening degree 82 derived in the current frame. On the other hand, as shown in FIGS. 13, 14, and 17, in a case where the records 85 for frames set in advance tracing back from the current frame are stored in the opening degree history information 72, the stop driving controller 79 performs the drive control of the stop opening degree adjustment mechanism 19 based on the opening degree history information 72. That is, the stop driving controller 79 decides whether or not to perform the drive control of the stop opening degree adjustment mechanism 19 based on the opening degree history information 72, depending on whether or not the records 85 sufficient to be referred to for the drive control of the stop opening degree adjustment mechanism 19 are stored in the opening degree history information 72. Therefore, it is possible to avoid a situation in which the drive control of the stop opening degree adjustment mechanism 19 is performed based on the opening degree history information 72 before the records 85 sufficient to be referred to for the drive control of the stop opening degree adjustment mechanism 19 are stored in the opening degree history information 72. It is possible to perform more appropriate stop drive in accordance with the number of records 85 of the opening degree history information 72.

As shown in FIG. 14, in a case where there is a difference between the target opening degree 81 and the current opening degree 82 of the records 85 for frames set in advance tracing back from the current frame and there is no change in the target opening degree 81 of the records 85 for frames set in advance tracing back from the current frame, the stop driving controller 79 suppress the drive control of the stop opening degree adjustment mechanism 19.

Figure 16:
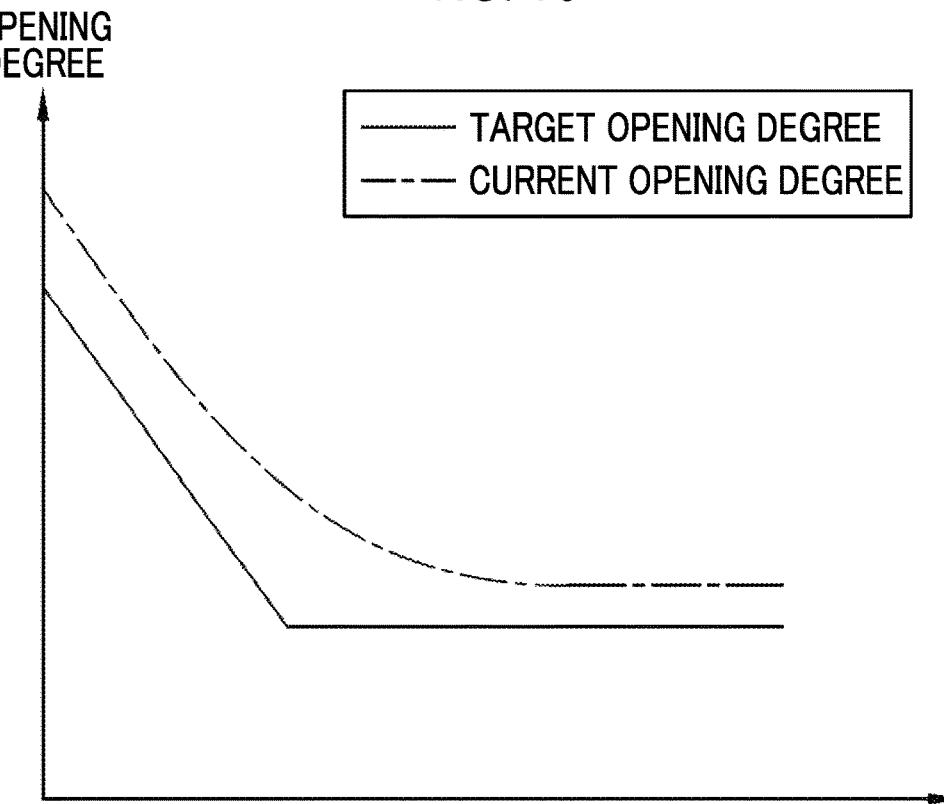
FIG. 16 is a graph showing another example of the situation in which there is a difference between the target opening degree and the current opening degree of records for frames set in advance tracing back from a current frame and there is no change in the target opening degree of the records for frames set in advance tracing back from the current frame.

The situation in which there is a difference between the target opening degree 81 and the current opening degree 82 of the records 85 for frames set in advance tracing back from the current frame and there is no change in the target opening degree 81 of the records 85 for frames set in advance tracing back from the current frame is a situation in which the current opening degree 82 substantially reaches the target opening degree 81, but the target opening degree 81 is not equal to the current opening degree 82 even in a case where the stop opening degree adjustment mechanism 19 is further driven due to a cause of the stop 16 itself, as shown in FIGS. 15 and 16. In such a situation, it is not meaningful to further drive the stop opening degree adjustment mechanism 19. Therefore, with the suppression of the drive of the stop opening degree adjustment mechanism 19 in a case where there is a difference between the target opening degree 81 and the current opening degree 82 of the records 85 for frames set in advance tracing back from the current frame and there is no change in the target opening degree 81 of the records 85 for frames set in advance tracing back from the current frame, it is possible to reduce power consumption due to unnecessary drive of the stop opening degree adjustment mechanism 19.

Second Embodiment

As shown in FIG. 20 as an example, in a second embodiment, in a case where there is a difference, which is equal to or less than five, between the target opening degree 81 and the current opening degree 82 of the records 85 for five frames tracing back from the current frame and there is a change in the target opening degree 81 of the records 85 for five frames tracing back from the current frame by a change amount equal to or less than five, the stop driving controller 79 increases the driving force applied to the stop 16 from the stop opening degree adjustment mechanism 19. The change amount of the target opening degree 81 is a difference in the target opening degree 81 between two consecutive frames. Here, "five" of the difference of five or less is an example of "first threshold value" according to the technique of the present disclosure. Further, "five" of the change amount of five or less is an example of "second threshold value" according to the technique of the present disclosure. FIG. 20 exemplifies a case where the current frame is a 35th frame from the start of the zoom operation, the difference between the target opening degree 81 and the current opening degree 82 of all the records 85 of 30 to 34 frames is two (≤five), and the change amount of the target opening degree 81 of all the records 85 of 30 to 34 frames is one (≤five).

Figure 21:
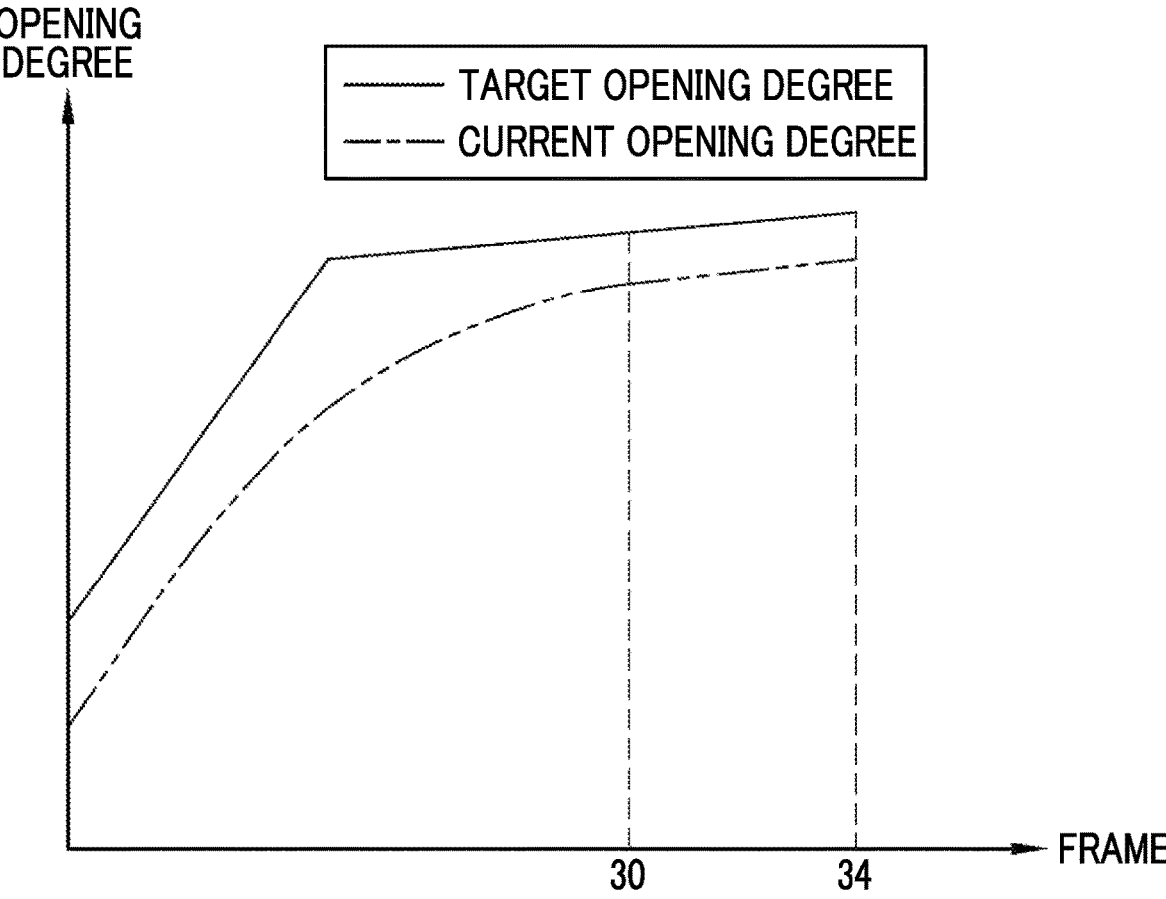
FIG. 21 is a graph showing an example of a situation in which there is a difference, which is equal to or less than a first threshold value set in advance, between the target opening degree and the current opening degree of records for frames set in advance tracing back from a current frame and there is a change in the target opening degree of the records for frames set in advance tracing back from the current frame by the change amount equal to or less than a second threshold value set in advance.

The situation in which there is a difference, which is equal to or less than five, between the target opening degree 81 and the current opening degree 82 of the records 85 for five frames tracing back from the current frame and there is a change in the target opening degree 81 of the records 85 for five frames tracing back from the current frame by the change amount equal to or less than five is considered as a situation such as a graph shown in FIG. 21 as an example. That is, the situation includes a situation in which the opening degree of the stop 16 follows the target opening degree 81 that is gradually increased according to the zoom operation in a state where the opening degree of the stop 16 is one step lower than the target opening degree 81. Although not shown, a situation is also considered in which the opening degree of the stop 16 follows the target opening degree 81 that is gradually decreased according to the zoom operation in a state where the opening degree of the stop 16 is one step higher than the target opening degree 81. The reason for such a situation is considered that the driving force applied to the stop 16 from the stop opening degree adjustment mechanism 19 is excessively small.

Further, as shown in FIG. 22 as an example, in the second embodiment, in a case where there is a difference, which is equal to or larger than three, between the target opening degree 81 and the current opening degree 82 of the records 85 for five frames tracing back from the current frame and the difference between the target opening degree 81 and the current opening degree 82 of the record 85 of a previous frame of the current frame is reversed in sign with the difference between the target opening degree 81 and the current opening degree 82 of the record 85 of the current frame, the stop driving controller 79 decreases the driving force applied to the stop 16 from the stop opening degree adjustment mechanism 19. Here, "three" of the difference of three or more is an example of "third threshold value" according to the technique of the present disclosure. FIG. 22 exemplifies a case where the current frame is a 35th frame from the start of the zoom operation, an absolute value of the difference between the target opening degree 81 and the current opening degree 82 of the records 85 of 30 to 34 frames is three to five (≥three), the difference between the target opening degree 81 and the current opening degree 82 of the record 85 of the 34th frame is +3 (positive), and the difference between the target opening degree 81 and the current opening degree 82 of the record 85 of the current frame (35th frame) is −4 (negative).

Figure 23:
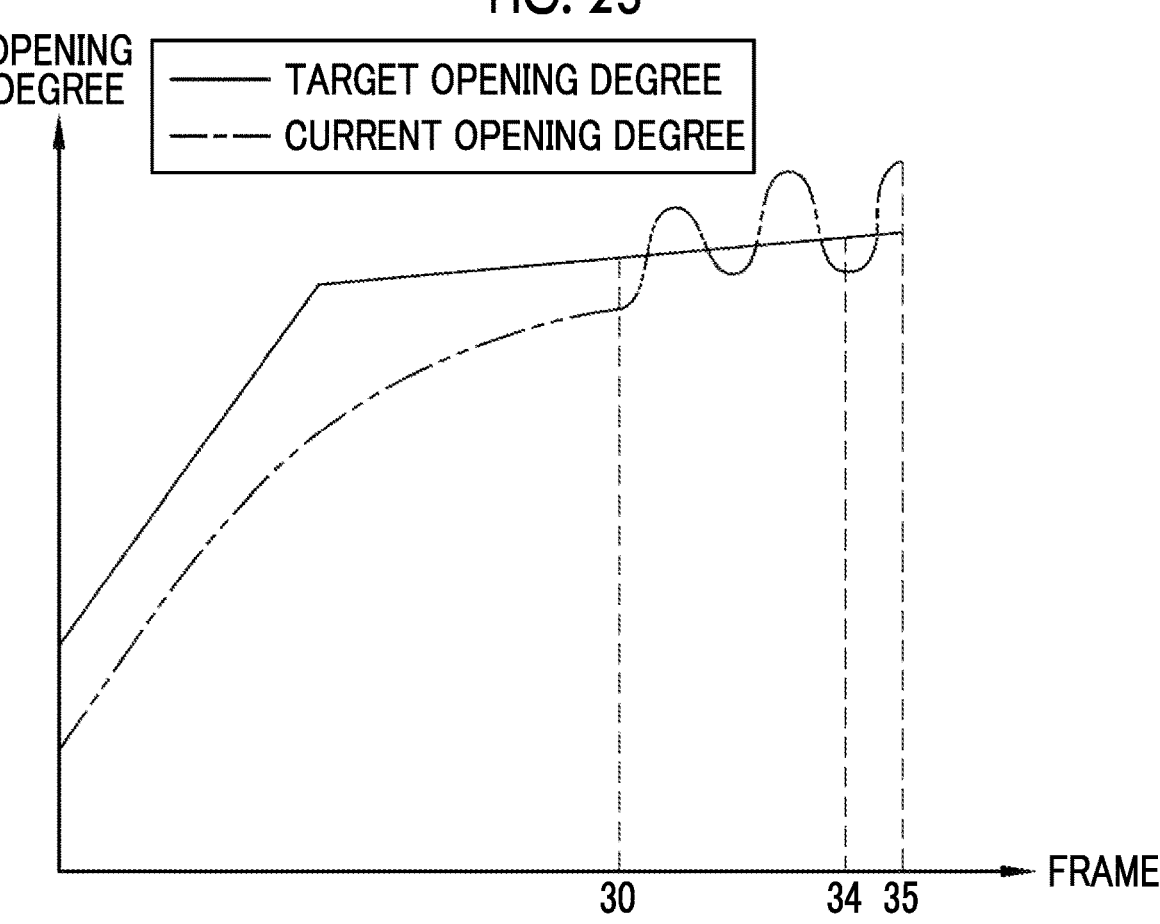
FIG. 23 is a graph showing an example of a situation in which there is a difference, which is equal to or larger than a third threshold value set in advance, between the target opening degree and the current opening degree of records for frames set in advance tracing back from a current frame and the difference between the target opening degree and the current opening degree of the record of a previous frame of the current frame is reversed in sign with the difference between the target opening degree and the current opening degree of the record of the current frame.

The situation in which there is a difference, which is equal to or larger than three, between the target opening degree 81 and the current opening degree 82 of the records 85 for five frames tracing back from the current frame and the difference between the target opening degree 81 and the current opening degree 82 of the record 85 of a previous frame of the current frame is reversed in sign with the difference between the target opening degree 81 and the current opening degree 82 of the record 85 of the current frame is considered as a situation such as a graph shown in FIG. 23 as an example. That is, the situation includes a situation in which the current opening degree 82 moves up and down with respect to the target opening degree 81 that is gradually increased according to the zoom operation, that is, hunting occurs. Although not shown, a situation is also considered in which the current opening degree 82 moves up and down with respect to the target opening degree 81 that is gradually decreased according to the zoom operation. The reason for such a situation is considered that the driving force applied to the stop 16 from the stop opening degree adjustment mechanism 19 is excessive.

Figure 24:
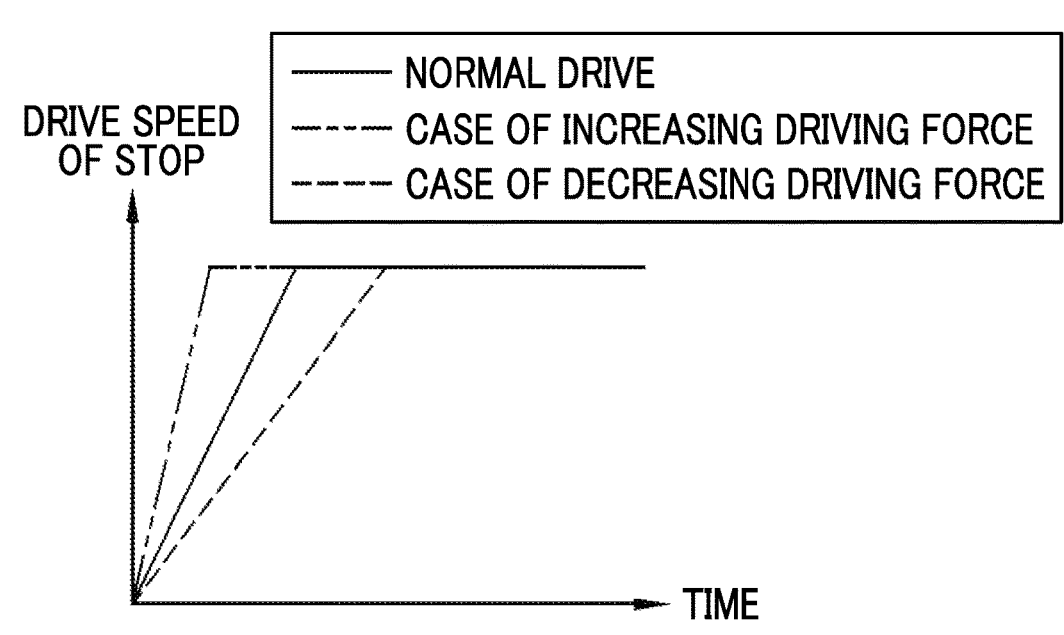
FIG. 24 is a diagram showing an example of cases where driving force applied to the stop from the stop opening degree adjustment mechanism is increased and decreased.

As shown in FIG. 24 as an example, specifically, the increase in the driving force applied to the stop 16 from the stop opening degree adjustment mechanism 19 means that a rise in a drive speed of the stop 16 at an initial stage of the drive is made steeper than in a normal drive. Further, specifically, the decrease in the driving force applied to the stop 16 from the stop opening degree adjustment mechanism 19 means that the rise in the drive speed of the stop 16 at an initial stage of the drive is made more gentle than in a normal drive.

Figure 25:
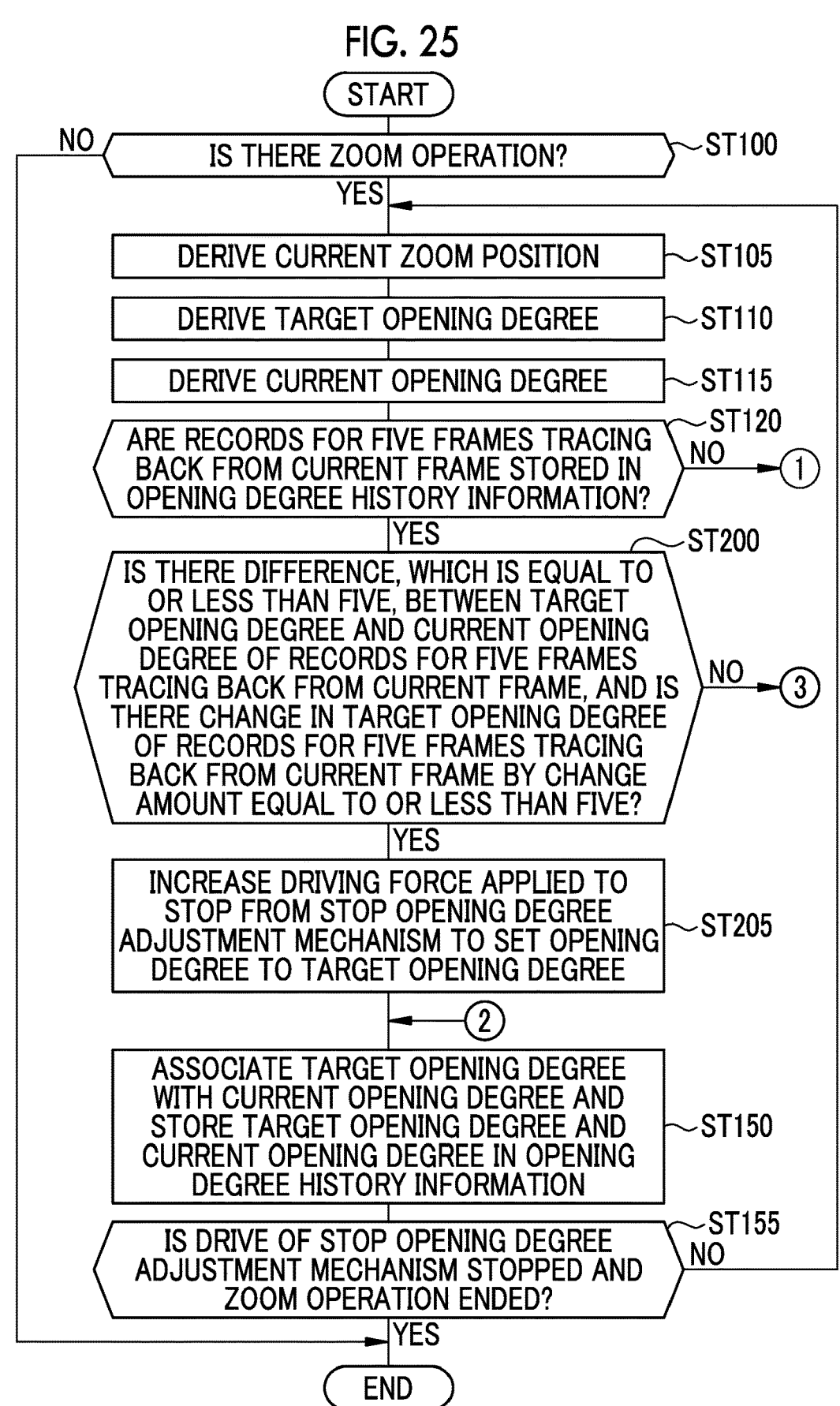
FIG. 25 is a flowchart showing a processing procedure of the CPU of a second embodiment.
Figure 26:
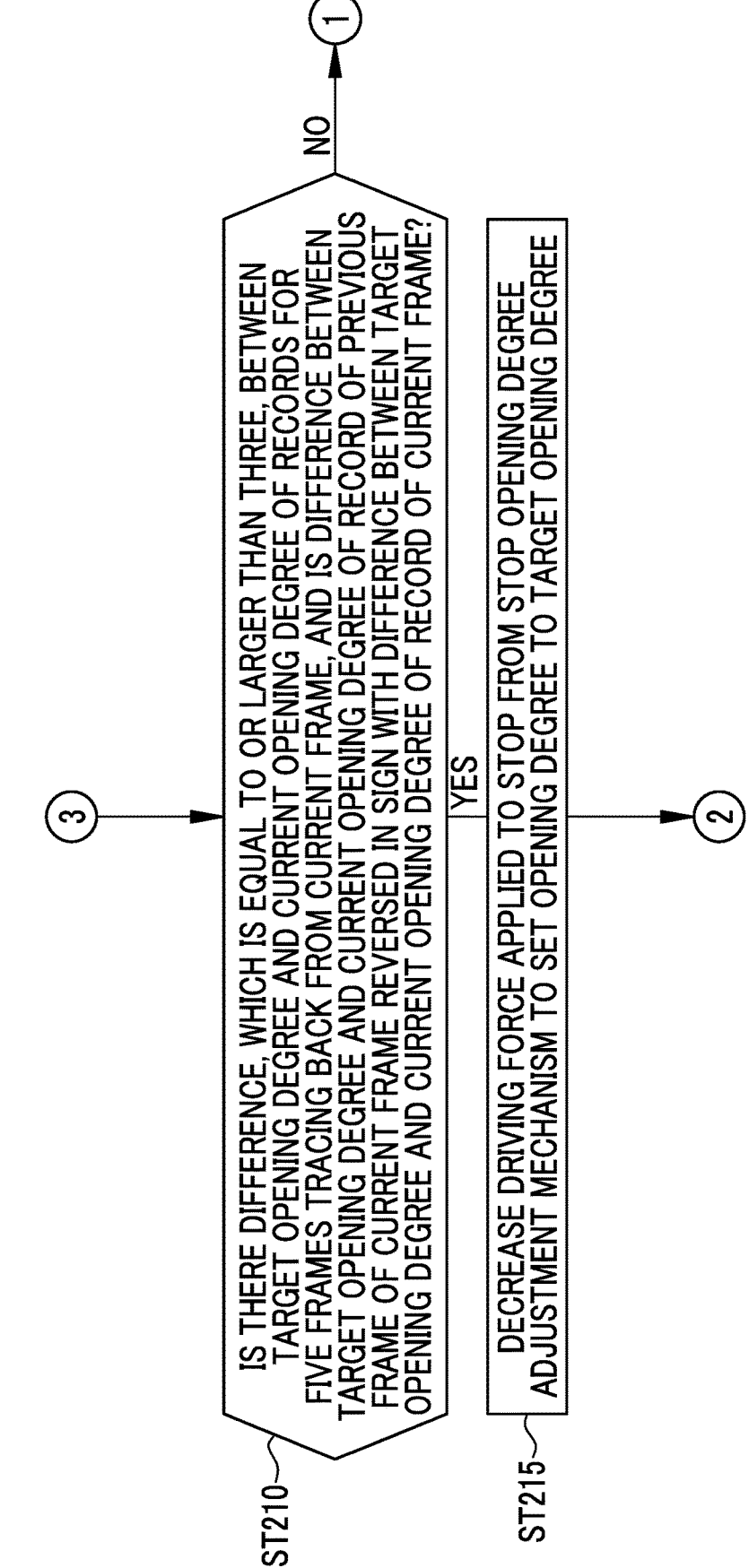
FIG. 26 is a flowchart showing the processing procedure of the CPU of the second embodiment.

FIGS. 25 and 26 show flowcharts for describing an action of the second embodiment. Description of steps common to the first embodiment will be omitted, and steps peculiar to the second embodiment will be mainly described.

In a case where the records 85 for five frames tracing back from the current frame are stored in the opening degree history information 72 (YES in step ST120), the processing proceeds to step ST200.

In step ST200, the stop driving controller 79 determines whether or not there is a difference, which is equal to or less than five, between the target opening degree 81 and the current opening degree 82 of the records 85 for five frames tracing back from the current frame and there is a change in the target opening degree 81 of the records 85 for five frames tracing back from the current frame by the change amount equal to or less than five. In a case where there is a difference, which is equal to or less than five, between the target opening degree 81 and the current opening degree 82 of the records 85 for five frames tracing back from the current frame and there is a change in the target opening degree 81 of the records 85 for five frames tracing back from the current frame by the change amount equal to or less than five (YES in step ST200), the stop driving controller 79 increases the driving force applied to the stop 16 from the stop opening degree adjustment mechanism 19 to set the opening degree of the stop 16 to the target opening degree 81 as shown in FIG. 20 (step ST205).

In a case where there is a difference, which is equal to or less than five, between the target opening degree 81 and the current opening degree 82 of the records 85 for five frames tracing back from the current frame and there is no change in the target opening degree 81 of the records 85 for five frames tracing back from the current frame by the change amount equal to or less than five (NO in step ST200), the processing proceeds to step ST210 of FIG. 26.

In step ST210, the stop driving controller 79 determines whether or not there is a difference, which is equal to or larger than three, between the target opening degree 81 and the current opening degree 82 of the records 85 for five frames tracing back from the current frame and the difference between the target opening degree 81 and the current opening degree 82 of the record 85 of a previous frame of the current frame is reversed in sign with the difference between the target opening degree 81 and the current opening degree 82 of the record 85 of the current frame. In a case where there is a difference, which is equal to or larger than three, between the target opening degree 81 and the current opening degree 82 of the records 85 for five frames tracing back from the current frame and the difference between the target opening degree 81 and the current opening degree 82 of the record 85 of a previous frame of the current frame is reversed in sign with the difference between the target opening degree 81 and the current opening degree 82 of the record 85 of the current frame (YES in step ST210), the stop driving controller 79 decreases the driving force applied to the stop 16 from the stop opening degree adjustment mechanism 19 to set the opening degree of the stop 16 to the target opening degree 81 as shown in FIG. 22 (step ST215).

In a case where there is a difference, which is equal to or larger than three, between the target opening degree 81 and the current opening degree 82 of the records 85 for five frames tracing back from the current frame and the difference between the target opening degree 81 and the current opening degree 82 of the record 85 of a previous frame of the current frame is not reversed in sign with the difference between the target opening degree 81 and the current opening degree 82 of the record 85 of the current frame (NO in step ST210), the processing proceeds to step ST135 of FIG. 19. Since the subsequent processing is the same as that of the first embodiment, the description thereof will be omitted.

As described above, in the second embodiment, as shown in FIG. 20, in a case where there is a difference, which is equal to or less than the first threshold value set in advance, between the target opening degree 81 and the current opening degree 82 of the records 85 for frames set in advance tracing back from the current frame and there is a change in the target opening degree 81 of the records 85 for frames set in advance tracing back from the current frame by the change amount equal to or less than the second threshold value set in advance, the stop driving controller 79 increases the driving force applied to the stop 16 from the stop opening degree adjustment mechanism 19. Therefore, it is possible to improve the situation in which the current opening degree 82 does not reach the target opening degree 81 due to the excessively small driving force applied to the stop 16 from the stop opening degree adjustment mechanism 19.

Further, in the second embodiment, as shown in FIG. 22, in a case where there is a difference, which is equal to or larger than the third threshold value set in advance, between the target opening degree 81 and the current opening degree 82 of the records 85 for frames set in advance tracing back from the current frame and the difference between the target opening degree 81 and the current opening degree 82 of the record 85 of a previous frame of the current frame is reversed in sign with the difference between the target opening degree 81 and the current opening degree 82 of the record 85 of the current frame, the stop driving controller 79 decreases the driving force applied to the stop 16 from the stop opening degree adjustment mechanism 19. Therefore, it is possible to improve the situation in which the current opening degree 82 does not reach the target opening degree 81 and is in hunting due to the excessive driving force applied to the stop 16 from the stop opening degree adjustment mechanism 19.

Third Embodiment

Figure 27:
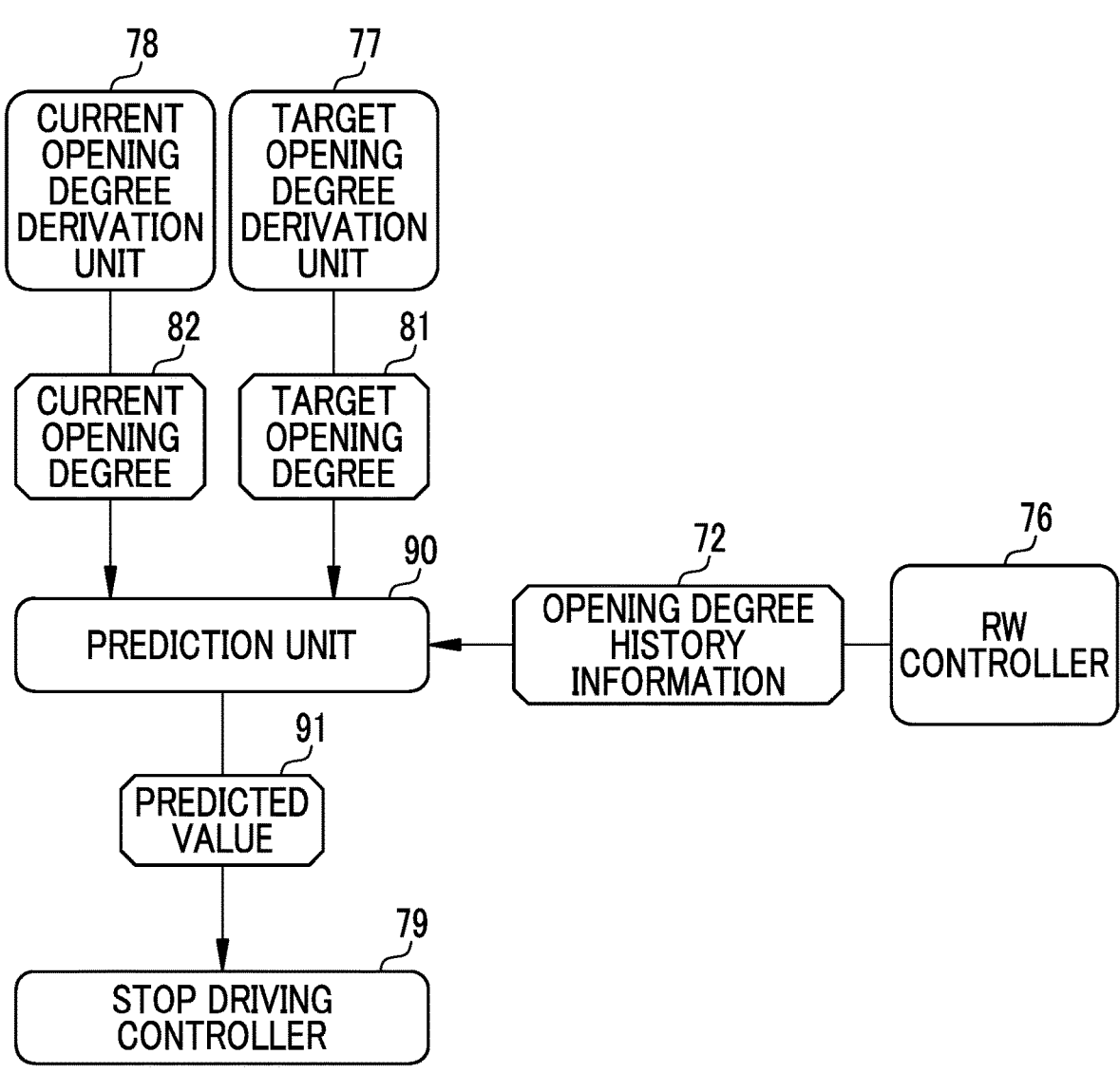
FIG. 27 is a block diagram showing a processing unit of the CPU of a third embodiment.

As shown in FIG. 27 as an example, the CPU 66 of the controller 20 according to a third embodiment functions as a prediction unit 90, in addition to the processing units 75 to 79 (only the current zoom position derivation unit 75 is not shown in FIG. 27) of the first embodiment. The target opening degree 81 is input to the prediction unit 90 from the target opening degree derivation unit 77, and the current opening degree 82 is input to the prediction unit 90 from the current opening degree derivation unit 78. Further, the opening degree history information 72 is input to the prediction unit 90 from the RW controller 76. The prediction unit 90 derives a predicted value 91 of the difference between the target opening degree 81 and the current opening degree 82 of the frame next to the current frame, based on the target opening degree 81 and the current opening degree 82 derived in the current frame, and the opening degree history information 72. The prediction unit 90 outputs the predicted value 91 to the stop driving controller 79. The stop driving controller 79 performs the drive control of the stop opening degree adjustment mechanism 19 based on the opening degree history information 72 and the predicted value 91. Although not shown for convenience, the target opening degree 81 and the current opening degree 82 are also output to the RW controller 76 and the stop driving controller 79 as in the first embodiment. Further, the opening degree history information 72 is also output to the stop driving controller 79.

Figure 28:
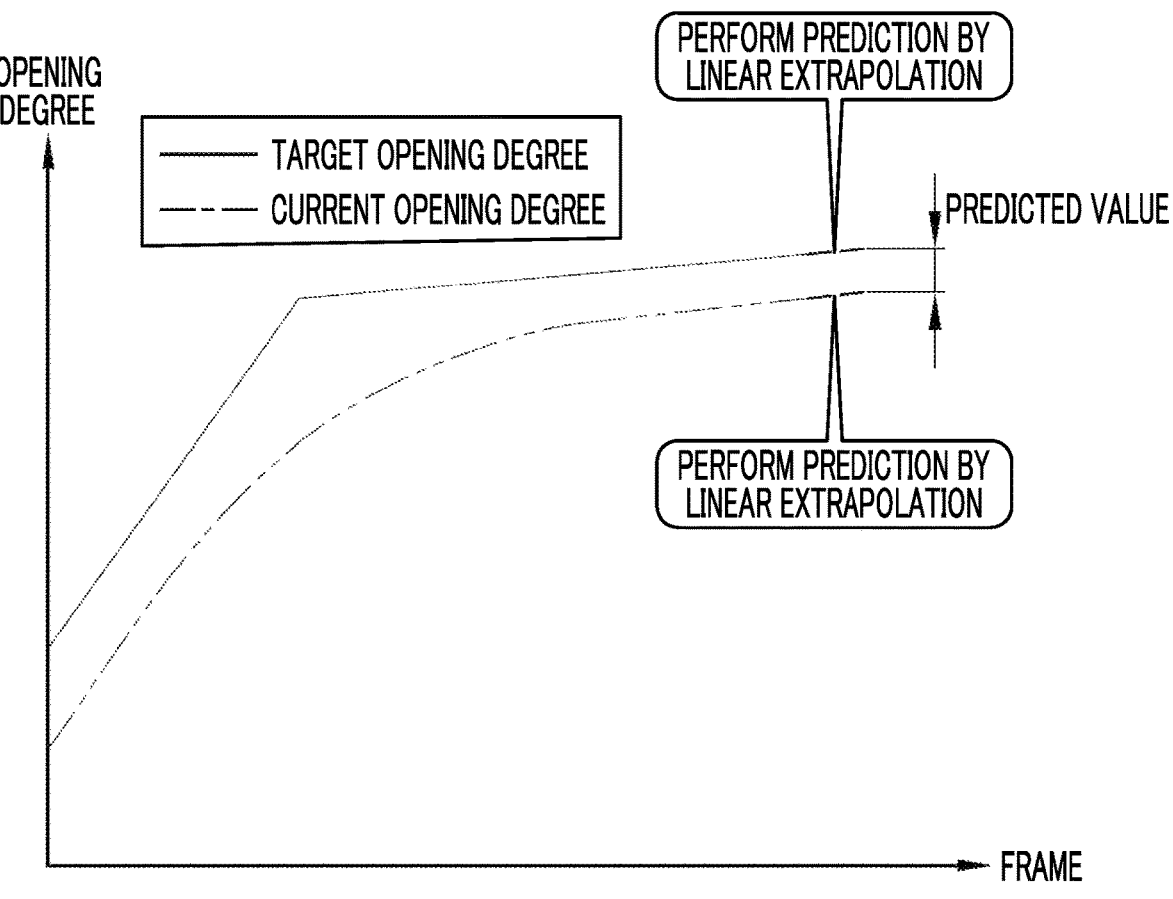
FIG. 28 is a diagram showing a state in which a predicted value of the difference between the target opening degree and the current opening degree of a frame next to the current frame is derived.

As shown in FIG. 28 as an example, the prediction unit 90 predicts the target opening degree 81 and the current opening degree 82 of the frame next to the current frame by linear extrapolation. The difference between the predicted target opening degree 81 and current opening degree 82 is output as the predicted value 91.

Figure 29:
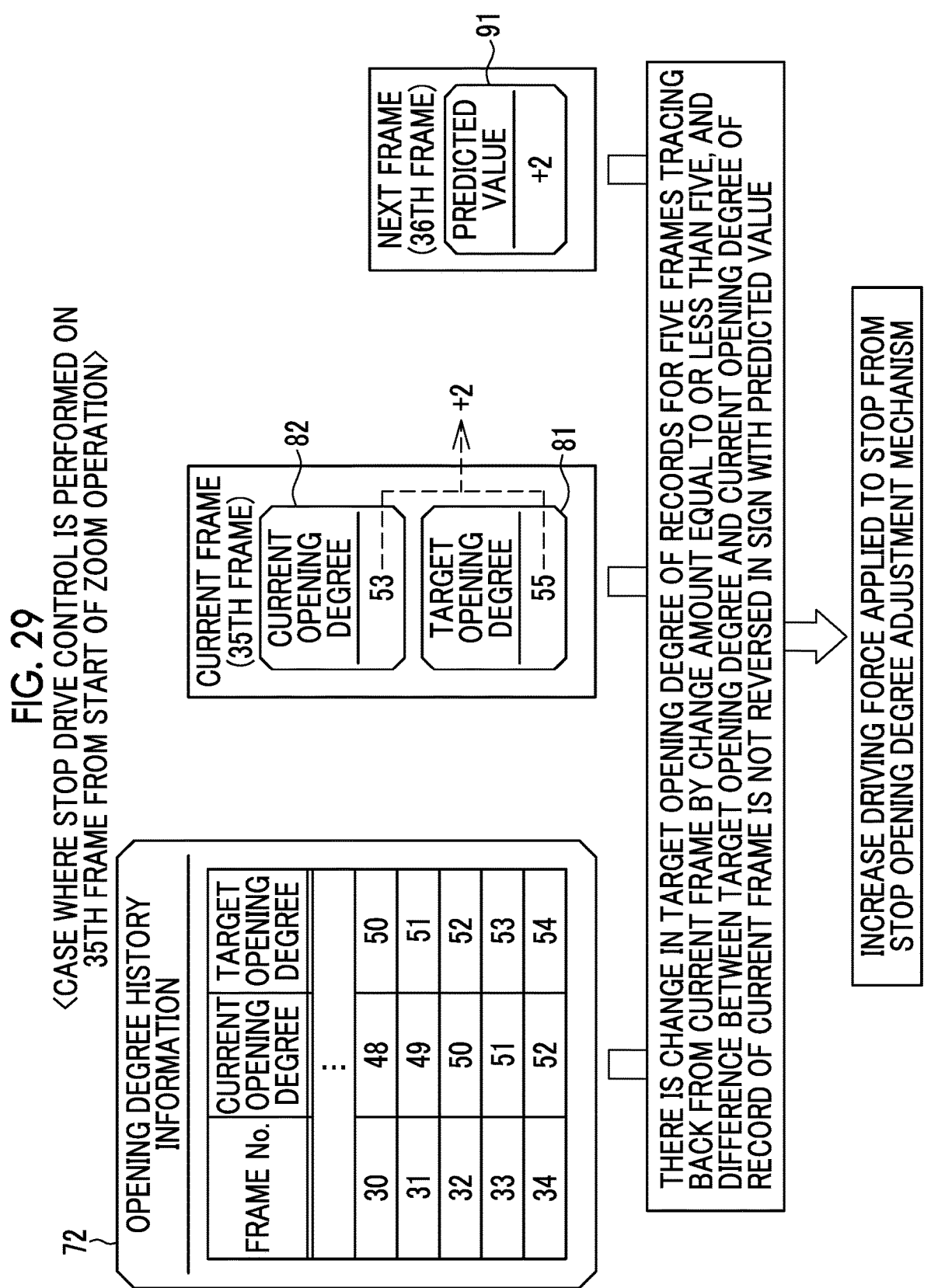
FIG. 29 is a diagram showing processing in a case where there is a change in the target opening degree of records for frames set in advance tracing back from the current frame by the change amount equal to or less than a fourth threshold value set in advance and the difference between the target opening degree and the current opening degree of the record of the current frame is not reversed in sign with the predicted value.

As shown in FIG. 29 as an example, in the third embodiment, in a case where there is a change in the target opening degree 81 of the records 85 for five frames tracing back from the current frame by the change amount equal to or less than five and the difference between the target opening degree 81 and the current opening degree 82 of the record 85 of the current frame is not reversed in sign with the predicted value 91, the stop driving controller 79 increases the driving force applied to the stop 16 from the stop opening degree adjustment mechanism 19. The change amount of the target opening degree 81 is the difference in the target opening degree 81 between two consecutive frames, as in the case of the second embodiment. Here, "five" of the change amount of five or less is an example of "fourth threshold value" according to the technique of the present disclosure. FIG. 29 exemplifies a case where the current frame is a 35th frame from the start of the zoom operation, the change amount of the target opening degree 81 of all the records 85 of 30 to 34 frames is one (≤five), the difference between the target opening degree 81 and the current opening degree 82 of the record 85 of the current frame (35th frame) is +2 (positive), and the predicted value 91 of the next frame (36th frame) is +2 (positive).

Figure 30:
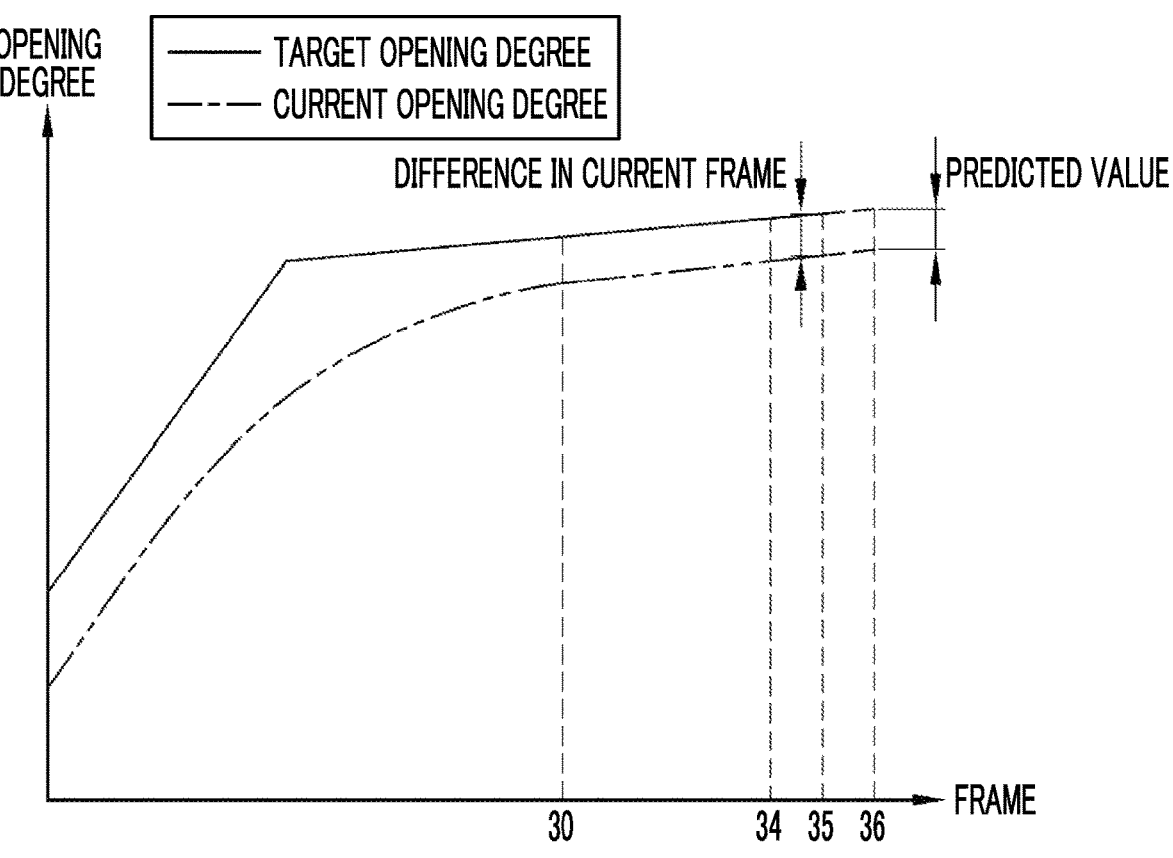
FIG. 30 is a graph showing an example of a situation in which there is a change in the target opening degree of records for frames set in advance tracing back from the current frame by the change amount equal to or less than a fourth threshold value set in advance and the difference between the target opening degree and the current opening degree of the record of the current frame is not reversed in sign with the predicted value.

The situation in which there is a change in the target opening degree 81 of the records 85 for five frames tracing back from the current frame by the change amount equal to or less than five and the difference between the target opening degree 81 and the current opening degree 82 of the record 85 of the current frame is not reversed in sign with the predicted value 91 is considered as a situation such as a graph shown in FIG. 30 as an example. That is, the situation includes a situation in which the opening degree of the stop 16 follows the target opening degree 81 that is gradually increased according to the zoom operation in a state where the opening degree of the stop 16 is one step lower than the target opening degree 81 and such a state is predicted to continue in the frame next to the current frame. Although not shown, a situation is also considered in which the opening degree of the stop 16 follows the target opening degree 81 that is gradually decreased according to the zoom operation in a state where the opening degree of the stop 16 is one step higher than the target opening degree 81 and such a state is predicted to continue in the frame next to the current frame. The reason for such a situation is considered that the driving force applied to the stop 16 from the stop opening degree adjustment mechanism 19 in the current frame is excessively small.

Figure 31:
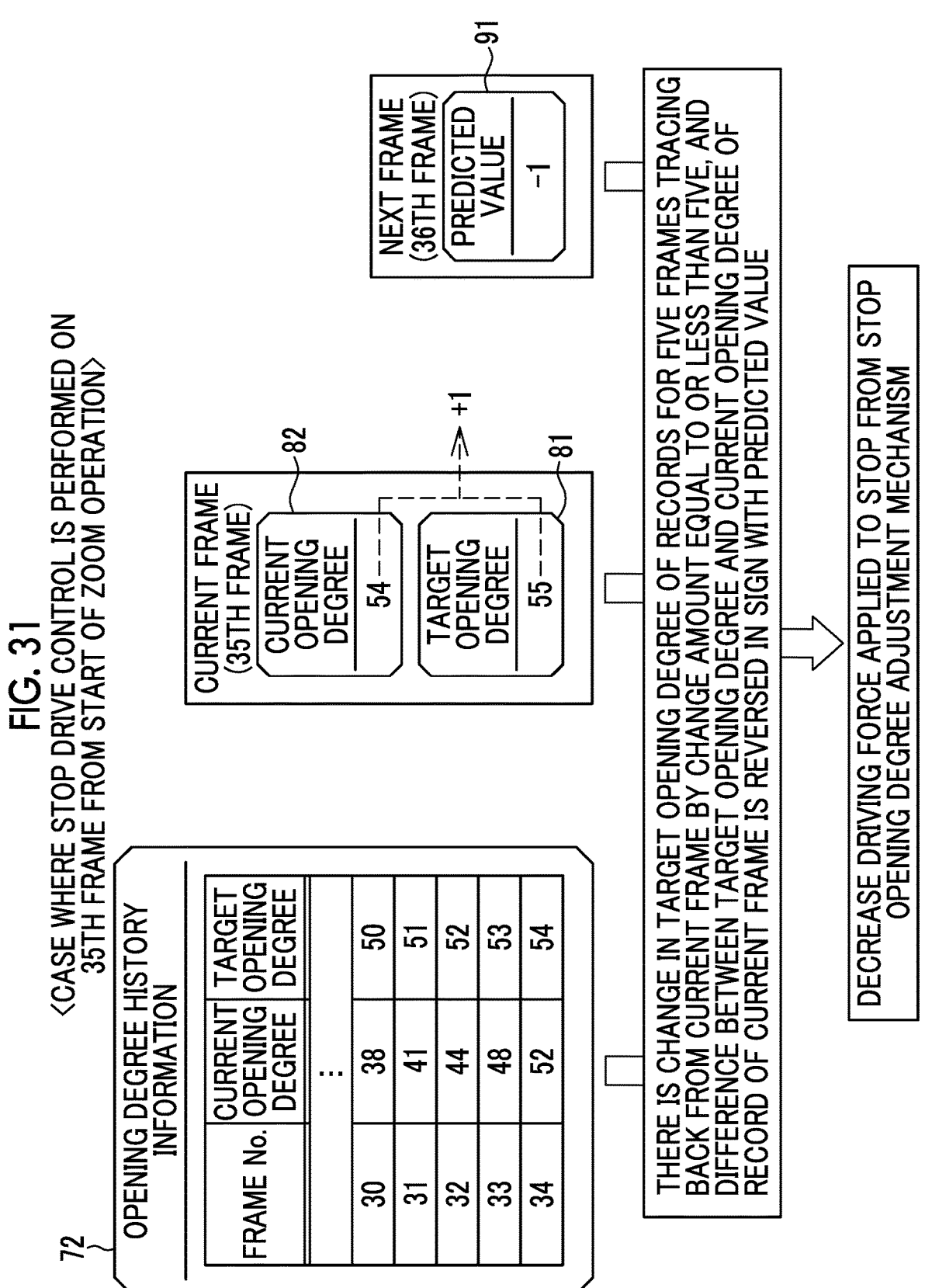
FIG. 31 is a diagram showing processing in a case where there is a change in the target opening degree of records for frames set in advance tracing back from the current frame by the change amount equal to or less than a fifth threshold value set in advance and the difference between the target opening degree and the current opening degree of the record of the current frame is reversed in sign with the predicted value.

Further, as shown in FIG. 31 as an example, in the third embodiment, in a case where there is a change in the target opening degree 81 of the records 85 for five frames tracing back from the current frame by the change amount equal to or less than five and the difference between the target opening degree 81 and the current opening degree 82 of the record 85 of the current frame is reversed in sign with the predicted value 91, the stop driving controller 79 decreases the driving force applied to the stop 16 from the stop opening degree adjustment mechanism 19. Here, "five" of the change amount of five or less is an example of "fifth threshold value" according to the technique of the present disclosure. FIG. 31 exemplifies a case where the current frame is a 35th frame from the start of the zoom operation, the change amount of the target opening degree 81 of all the records 85 of 30 to 34 frames is one (≤five), the difference between the target opening degree 81 and the current opening degree 82 of the record 85 of the current frame (35th frame) is +1 (positive), and the predicted value 91 of the next frame (36th frame) is −1 (negative). A method of increasing or decreasing the driving force applied to the stop 16 from the stop opening degree adjustment mechanism 19 is the same as the method shown in FIG. 24 of the second embodiment.

Figure 32:
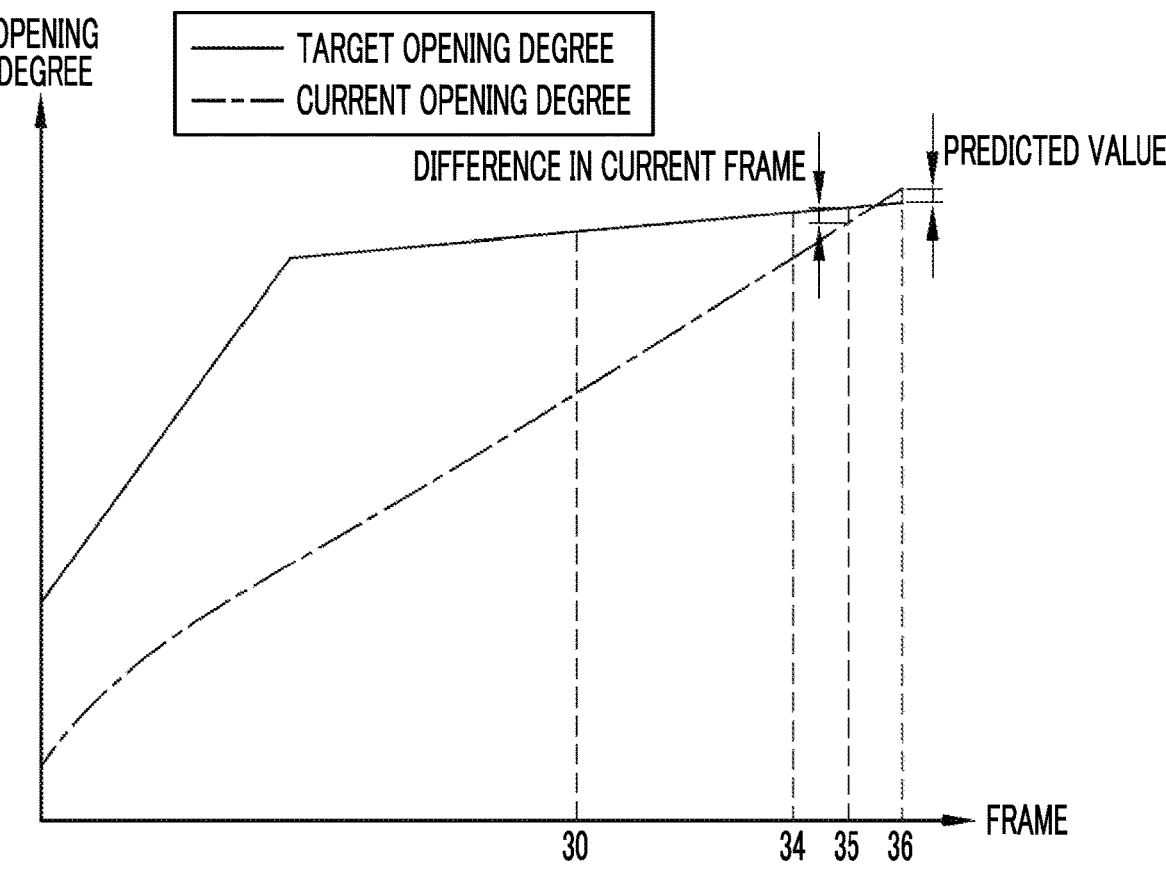
FIG. 32 is a graph showing an example of a situation in which there is a change in the target opening degree of records for frames set in advance tracing back from the current frame by the change amount equal to or less than a fifth threshold value set in advance and the difference between the target opening degree and the current opening degree of the record of the current frame is reversed in sign with the predicted value.

The situation in which there is a change in the target opening degree 81 of the records 85 for five frames tracing back from the current frame by the change amount equal to or less than five and the difference between the target opening degree 81 and the current opening degree 82 of the record 85 of the current frame is reversed in sign with the predicted value 91 is considered as a situation such as a graph shown in FIG. 32 as an example. That is, the situation includes a situation in which the current opening degree 82 is predicted to exceed the target opening degree 81 that is gradually increased according to the zoom operation in the frame next to the current frame, that is, to overshoot. Although not shown, a situation is also considered in which the current opening degree 82 is predicted to fall below the target opening degree 81 that is gradually increased according to the zoom operation in the frame next to the current frame, that is, to undershoot. The reason for such a situation is considered that the driving force applied to the stop 16 from the stop opening degree adjustment mechanism 19 in the current frame is excessive.

Figure 33:
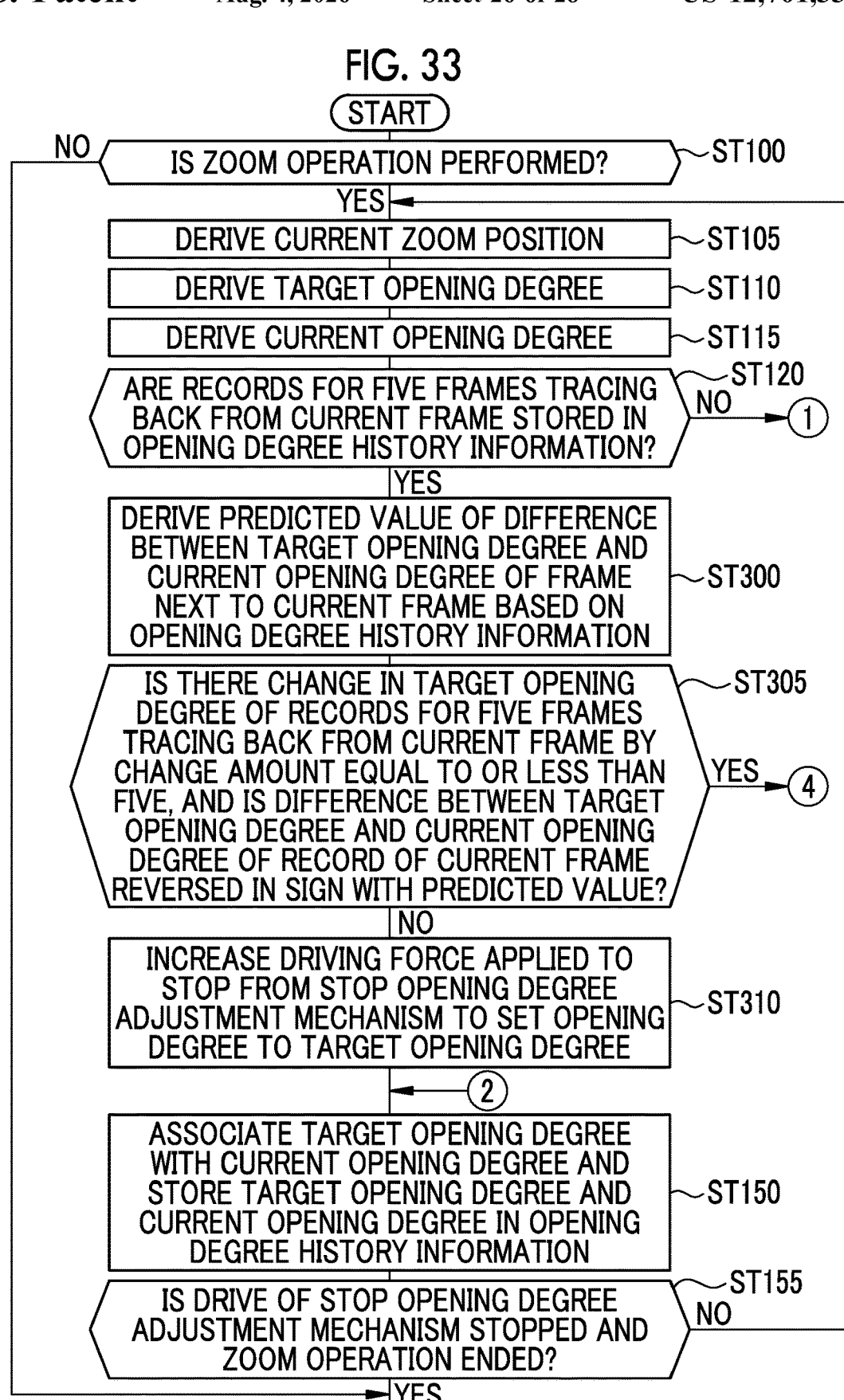
FIG. 33 is a flowchart showing a processing procedure of the CPU of the third embodiment.
Figure 34:
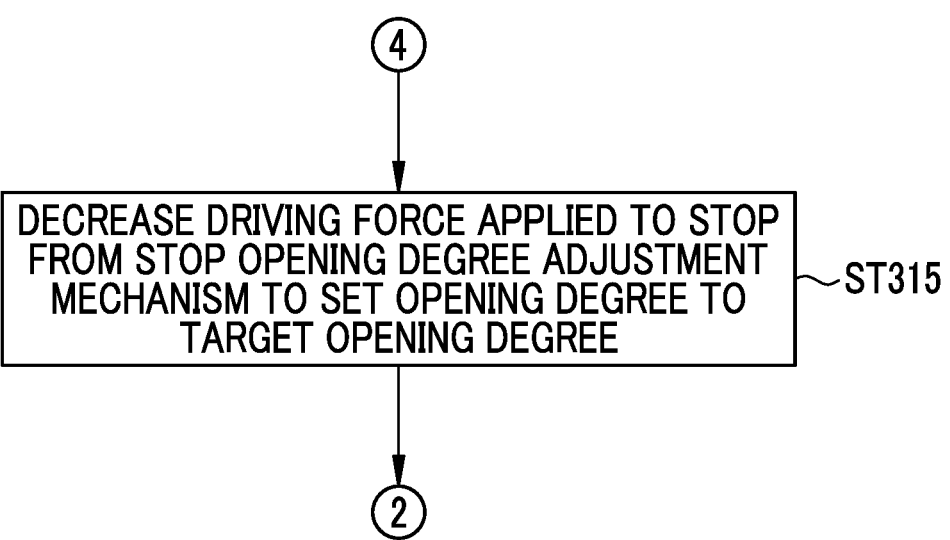
FIG. 34 is a flowchart showing the processing procedure of the CPU of the third embodiment.

FIGS. 33 and 34 show flowcharts for describing an action of the third embodiment.

Description of steps common to the first embodiment will be omitted, and steps peculiar to the third embodiment will be mainly described.

In a case where the records 85 for five frames tracing back from the current frame are stored in the opening degree history information 72 (YES in step ST120), the processing proceeds to step ST300.

In step ST300, as shown in FIGS. 27 and 28, the prediction unit 90 derives the predicted value 91 of the difference between the target opening degree 81 and the current opening degree 82 of the frame next to the current frame, based on the target opening degree 81 and the current opening degree 82 derived in the current frame, and the opening degree history information 72. The predicted value 91 is output from the prediction unit 90 to the stop driving controller 79.

In subsequent step ST305, the stop driving controller 79 determines whether or not there is a change in the target opening degree 81 of the records 85 for five frames tracing back from the current frame by the change amount equal to or less than five and the difference between the target opening degree 81 and the current opening degree 82 of the record 85 of the current frame is reversed in sign with the predicted value 91. In a case where there is a change in the target opening degree 81 of the records 85 for five frames tracing back from the current frame by the change amount equal to or less than five and the difference between the target opening degree 81 and the current opening degree 82 of the record 85 of the current frame is not reversed in sign with the predicted value 91 (NO in step ST305), the stop driving controller 79 increases the driving force applied to the stop 16 from the stop opening degree adjustment mechanism 19 to set the opening degree of the stop 16 to the target opening degree 81 as shown in FIG. 29 (step ST310).

On the other hand, in a case where there is a change in the target opening degree 81 of the records 85 for five frames tracing back from the current frame by the change amount equal to or less than five and the difference between the target opening degree 81 and the current opening degree 82 of the record 85 of the current frame is reversed in sign with the predicted value 91 (YES in step ST305), the stop driving controller 79 decreases the driving force applied to the stop 16 from the stop opening degree adjustment mechanism 19 to set the opening degree of the stop 16 to the target opening degree 81 as shown in FIG. 31 (step ST315 in FIG. 34).

As described above, in the third embodiment, the prediction unit 90 derives the predicted value 91 of the difference between the target opening degree 81 and the current opening degree 82 of the frame next to the current frame, based on the opening degree history information 72. Therefore, it is possible to perform the drive control of the stop opening degree adjustment mechanism 19 based on the predicted value 91 as well as the opening degree history information 72.

Further, in the third embodiment, as shown in FIG. 29, in a case where there is a change in the target opening degree 81 of the records 85 for frames set in advance tracing back from the current frame by the change amount equal to or less than the fourth threshold value set in advance and the difference between the target opening degree 81 and the current opening degree 82 of the record 85 of the current frame is not reversed in sign with the predicted value 91, the stop driving controller 79 increases the driving force applied to the stop 16 from the stop opening degree adjustment mechanism 19. Therefore, it is possible to improve the situation in which the current opening degree 82 does not reach the target opening degree 81 in the next frame due to the excessively small driving force applied to the stop 16 from the stop opening degree adjustment mechanism 19 in the current frame.

Further, in the third embodiment, as shown in FIG. 31, in a case where there is a change in the target opening degree 81 of the records 85 for frames set in advance tracing back from the current frame by the change amount equal to or less than the fifth threshold value set in advance and the difference between the target opening degree 81 and the current opening degree 82 of the record 85 of the current frame is reversed in sign with the predicted value 91, the stop driving controller 79 decreases the driving force applied to the stop 16 from the stop opening degree adjustment mechanism 19. Therefore, it is possible to improve the situation in which the current opening degree 82 does not reach the target opening degree 81 and overshoots or undershoots in the next frame due to the excessive driving force applied to the stop 16 from the stop opening degree adjustment mechanism 19 in the current frame.

The first embodiment, the second embodiment, and the third embodiment may be combined and implemented.

Fourth Embodiment

Figure 35:
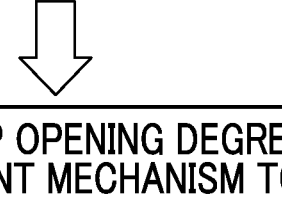
FIG. 35 is a diagram showing processing in a case where the difference between the target opening degree and the current opening degree is equal to or larger than a sixth threshold value set in advance.
Figures 36, 37:
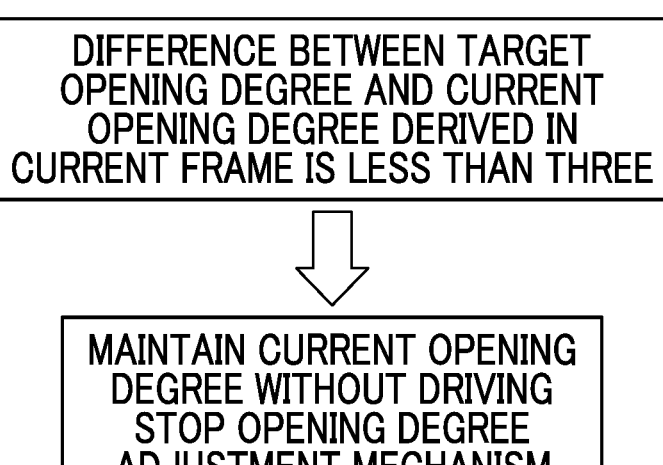
FIG. 36 is a diagram showing processing in a case where the difference between the target opening degree and the current opening degree is less than the sixth threshold value set in advance.
FIG. 37 is a diagram showing an aspect in which the driving force applied to the stop from the stop opening degree adjustment mechanism is changed according to an operation speed of the zoom lens.

As shown in FIG. 35 as an example, in the fourth embodiment, in a case where the difference between the target opening degree 81 and the current opening degree 82 derived in the current frame is equal to or larger than three, the stop driving controller 79 drives the stop opening degree adjustment mechanism 19 to set the opening degree of the stop 16 to the target opening degree 81. On the other hand, as shown in FIG. 36 as an example, in a case where the difference between the target opening degree 81 and the current opening degree 82 derived in the current frame is less than three, the stop driving controller 79 maintains the current opening degree 82 without driving the stop opening degree adjustment mechanism 19. Here, "three" of three or more or less than three is an example of "sixth threshold value" according to the technique of the present disclosure.

With providing of a margin of the sixth threshold value in the difference between the target opening degree 81 and the current opening degree 82 required for driving the stop opening degree adjustment mechanism 19 in this manner, it is possible to prevent the stop opening degree adjustment mechanism 19 from being sensitively driven in a case where the difference between the target opening degree 81 and the current opening degree 82 is minute. Further, with setting of the sixth threshold value to a value at which the user does not notice a change in the image brightness, it is possible for the user not to notice the fluctuation of the image brightness in a case where the difference between the target opening degree 81 and the current opening degree 82 is equal to or larger than three and thus, the stop opening degree adjustment mechanism 19 is driven.

Fifth Embodiment

As shown in FIG. 37 as an example, in a fifth embodiment, the stop driving controller 79 changes the driving force applied to the stop 16 from the stop opening degree adjustment mechanism 19 according to the operation speed of the zoom lens 15 by the zoom operation. More specifically, in a case where the operation speed of the zoom lens 15 is relatively fast, the stop driving controller 79 makes the rise of the drive speed of the stop 16 in the initial stage of driving steep to increase the driving force applied to the stop 16 from the stop opening degree adjustment mechanism 19. On the other hand, in a case where the operation speed of the zoom lens 15 is relatively slow, the stop driving controller 79 makes the rise in the drive speed of the stop 16 at the initial stage of the drive gentle to decrease the driving force applied to the stop 16 from the stop opening degree adjustment mechanism 19.

As described above, in the fifth embodiment, the stop driving controller 79 changes the driving force applied to the stop 16 from the stop opening degree adjustment mechanism 19 according to the operation speed of the zoom lens 15. Therefore, it is possible to perform appropriate stop drive in accordance with the operation speed of the zoom lens 15.

The number of frames to determine whether to perform the drive control of the stop opening degree adjustment mechanism 19 based on the target opening degree 81 and the current opening degree 82 derived in the current frame or perform the drive control of the stop opening degree adjustment mechanism 19 based on the opening degree history information 72 and the numbers shown above as the first to sixth threshold values are merely examples. A configuration may be employed in which the user can set the number of frames to determine whether to perform the drive control of the stop opening degree adjustment mechanism 19 based on the target opening degree 81 and the current opening degree 82 derived in the current frame or perform the drive control of the stop opening degree adjustment mechanism 19 based on the opening degree history information 72 and the first to sixth threshold values.

The imaging apparatus according to the technique of the present disclosure may be a compact digital camera, a smartphone, or a tablet terminal.

In each of the embodiments described above, for example, as a hardware structure of processing units executing various pieces of processing, such as the image processing unit 27, the display controller 30, the instruction receiving unit 32, the current zoom position derivation unit 75, the RW controller 76, the target opening degree derivation unit 77, the current opening degree derivation unit 78, the stop driving controller 79, and the prediction unit 90, the following various processors can be used. The various processors include, for example, the CPU 66 which is a general-purpose processor executing software (operation program 70) to function as various processing units, a programmable logic device (PLD), such as a field programmable gate array (FPGA), which is a processor whose circuit configuration can be changed after manufacture, and/or a dedicated electric circuit, such as an application specific integrated circuit (ASIC), which is a processor having a dedicated circuit configuration designed to execute specific processing.

One processing unit may be configured by one of the various types of processors or may be configured by a combination of two or more processors of the same type or different types (for example, a combination of a plurality of FPGAs and/or a combination of a CPU and an FPGA). Further, the plurality of processing units may be configured of one processor.

As an example of configuring the plurality of processing units with one processor, first, there is a form in which one processor is configured by a combination of one or more CPUs and software and the processor functions as the plurality of processing units, as represented by computers such as a client and a server. Second, there is a form in which a processor that realizes the functions of the entire system including the plurality of processing units with one integrated circuit (IC) chip is used, as represented by a system-on-chip (SoC) or the like. As described above, the various processing units are configured using one or more of the various processors as the hardware structure.

More specifically, a circuitry combining circuit elements such as semiconductor elements may be used as the hardware structure of the various processors.

It is possible to understand the techniques described in the following supplementary notes from the above description.

Supplementary Note 1

A stop drive control device comprising:
a processor,
wherein the processor is configured to:
perform drive control of a stop opening degree adjustment mechanism that adjusts an opening degree of a stop, based on opening degree history information in which the opening degree of the stop is associated with a target opening degree of the stop in accordance with a fluctuation of a focal length of a zoom lens.

Supplementary Note 2

The stop drive control device according to Supplementary Note 1,
wherein the target opening degree is a value in accordance with information regarding the focal length during an operation of the zoom lens, and
the processor is configured to:
perform the drive control of the stop opening degree adjustment mechanism during the operation of the zoom lens based on the opening degree history information.

Supplementary Note 3

The stop drive control device according to Supplementary Note 1 or 2,
wherein the processor is configured to:
perform control of associating the target opening degree with a current opening degree and storing the target opening degree and the current opening degree in a storage unit as one record of the opening degree history information.

Supplementary Note 4

The stop drive control device according to Supplementary Note 3, wherein the processor is configured to:
perform control of storing the record in the storage unit according to frames sequentially output by an imaging element.

Supplementary Note 5

The stop drive control device according to Supplementary Note 4,
wherein the processor is configured to:
in a case where records for frames set in advance tracing back from a current frame are not stored in the opening degree history information, perform the drive control based on the target opening degree and the current opening degree derived in the current frame; and
in a case where records for frames set in advance tracing back from a current frame are stored in the opening degree history information, perform the drive control based on the opening degree history information.

Supplementary Note 6

The stop drive control device according to Supplementary Note 5,
wherein the processor is configured to:
in a case where there is a difference between the target opening degree and the current opening degree of the records for frames set in advance tracing back from the current frame and there is no change in the target opening degree of the records for frames set in advance tracing back from the current frame,
suppress the drive of the stop opening degree adjustment mechanism.

Supplementary Note 7

The stop drive control device according to Supplementary Note 5 or 6,
wherein the processor is configured to:
in a case where there is a difference, which is equal to or less than a first threshold value set in advance, between the target opening degree and the current opening degree of the records for frames set in advance tracing back from the current frame and there is a change in the target opening degree of the records for frames set in advance tracing back from the current frame by a change amount equal to or less than a second threshold value set in advance,
increase driving force applied to the stop from the stop opening degree adjustment mechanism.

Supplementary Note 8

The stop drive control device according to any one of Supplementary Notes 5 to 7,
wherein the processor is configured to:
in a case where there is a difference, which is equal to or larger than a third threshold value set in advance, between the target opening degree and the current opening degree of the records for frames set in advance tracing back from the current frame and a difference between the target opening degree and the current opening degree of the record of a previous frame of the current frame is reversed in sign with a difference between the target opening degree and the current opening degree of the record of the current frame, decrease driving force applied to the stop from the stop opening degree adjustment mechanism.

Supplementary Note 9

The stop drive control device according to any one of Supplementary Notes 5 to 8,
wherein the processor is configured to:
derive a predicted value of a difference between the target opening degree and the current opening degree of a frame next to the current frame based on the opening degree history information.

Supplementary Note 10

The stop drive control device according to Supplementary Note 9,
wherein the processor is configured to:
in a case where there is a change in the target opening degree of the records for frames set in advance tracing back from the current frame by a change amount equal to or less than a fourth threshold value set in advance and a difference between the target opening degree and the current opening degree of the record of the current frame is not reversed in sign with the predicted value, increase driving force applied to the stop from the stop opening degree adjustment mechanism.

Supplementary Note 11

The stop drive control device according to Supplementary Note 9 or 10,
wherein the processor is configured to:
in a case where there is a change in the target opening degree of the records for frames set in advance tracing back from the current frame by a change amount equal to or less than a fifth threshold value set in advance and a difference between the target opening degree and the current opening degree of the record of the current frame is reversed in sign with the predicted value, decrease driving force applied to the stop from the stop opening degree adjustment mechanism.

Supplementary Note 12

The stop drive control device according to any one of Supplementary Notes 1 to 11,
wherein the processor is configured to:
in a case where a difference between the target opening degree and a current opening degree is equal to or larger than a sixth threshold value set in advance, drive the stop opening degree adjustment mechanism to set the current opening degree to the target opening degree; and
in a case where the difference is less than the sixth threshold value, maintain the current opening degree without driving the stop opening degree adjustment mechanism.

Supplementary Note 13

The stop drive control device according to any one of Supplementary Notes 1 to 12,
wherein the processor is configured to:
change driving force applied to the stop from the stop opening degree adjustment mechanism according to an operation speed of the zoom lens.

Supplementary Note 14

An imaging apparatus comprising:
the stop drive control device according to any one of Supplementary Notes 1 to 13.

The above various embodiments and/or various modification examples can be combined as appropriate in the technique of the present disclosure. Further, it is needless to say that the technique of the present disclosure is not limited to each of the embodiments described above and various configurations can be employed without departing from the gist. Further, the technique of the present disclosure extends to a storage medium that stores the program non-transitorily, in addition to the program.

The description content and the illustrated content described above are detailed descriptions of portions according to the technique of the present disclosure and are merely an example of the technique of the present disclosure. For example, the above description of the configurations, functions, actions, and effects is an example of the configurations, functions, actions, and effects of the portions according to the technique of the present disclosure. Therefore, it is needless to say that an unnecessary part may be deleted, a new element may be added, or a replacement may be performed to the description content and the illustrated content described above within a scope not departing from the gist of the technique of the present disclosure. Further, in order to avoid complication and facilitate understanding of the portion according to the technique of the present disclosure, the description related to common general knowledge not requiring special description in order to implement the technique of the present disclosure is omitted in the above description content and illustrated content.

In the present specification, "A and/or B" is synonymous with "at least one of A or B". That is, "A and/or B" means that only A may be used, only B may be used, or a combination of A and B may be used. Further, in the present specification, the same concept as "A and/or B" is also applied to a case where three or more matters are linked and expressed by "and/or".

All documents, patent applications, and technical standards described in the present specification are incorporated by reference in the present specification to the same extent as in a case where the incorporation of each individual document, patent application, and technical standard by reference is specifically and individually described.

What is claimed is:
1. A stop drive control device comprising:
a processor,
wherein the processor is configured to:
perform drive control of a stop opening degree adjustment mechanism that adjusts an opening degree of a stop, based on opening degree history information stored in a storage unit and comprising a plurality of records, each record including a target opening degree of the stop and a current opening degree of the stop, the drive control being in accordance with a fluctuation of a focal length of a zoom lens during operation of the zoom lens; and
for each frame sequentially output by an imaging element, store in the storage unit a record associating the target opening degree with the current opening degree as part of the opening degree history information.
2. The stop drive control device according to claim 1,
wherein the target opening degree is determined in accordance with focal length information obtained during operation of the zoom lens, and the processor is configured to:

perform the drive control during operation of the zoom lens based on the opening degree history information.

3. The stop drive control device according to claim 1, wherein the processor is configured to:

in a case where records for frames set in advance tracing back from a current frame are not stored in the opening degree history information, perform the drive control based on the target opening degree and the current opening degree derived in the current frame; and in a case where records for frames set in advance tracing back from a current frame are stored in the opening degree history information, perform the drive control based on the opening degree history information.

4. The stop drive control device according to claim 3, wherein the processor is configured to:

in a case where there is a difference between the target opening degree and the current opening degree of the records for frames set in advance tracing back from the current frame and there is no change in the target opening degree of the records for frames set in advance tracing back from the current frame, suppress the drive of the stop opening degree adjustment mechanism.

5. The stop drive control device according to claim 3, wherein the processor is configured to:

in a case where there is a difference, which is equal to or less than a first threshold value set in advance, between the target opening degree and the current opening degree of the records for frames set in advance tracing back from the current frame and there is a change in the target opening degree of the records for frames set in advance tracing back from the current frame by a change amount equal to or less than a second threshold value set in advance, increase driving force applied to the stop from the stop opening degree adjustment mechanism.

6. The stop drive control device according to claim 3, wherein the processor is configured to:

in a case where there is a difference, which is equal to or larger than a third threshold value set in advance, between the target opening degree and the current opening degree of the records for frames set in advance tracing back from the current frame and a difference between the target opening degree and the current opening degree of the record of a previous frame of the current frame is reversed in sign with a difference between the target opening degree and the current opening degree of the record of the current frame, decrease driving force applied to the stop from the stop opening degree adjustment mechanism.

7. The stop drive control device according to claim 3, wherein the processor is configured to:

derive a predicted value of a difference between the target opening degree and the current opening degree of a frame next to the current frame based on the opening degree history information.

8. The stop drive control device according to claim 7, wherein the processor is configured to:

in a case where there is a change in the target opening degree of the records for frames set in advance tracing back from the current frame by a change amount equal to or less than a fourth threshold value set in advance and a difference between the target opening degree and the current opening degree of the record of the current frame is not reversed in sign with the predicted value, increase driving force applied to the stop from the stop opening degree adjustment mechanism.

9. The stop drive control device according to claim 7, wherein the processor is configured to:

in a case where there is a change in the target opening degree of the records for frames set in advance tracing back from the current frame by a change amount equal to or less than a fifth threshold value set in advance and a difference between the target opening degree and the current opening degree of the record of the current frame is reversed in sign with the predicted value, decrease driving force applied to the stop from the stop opening degree adjustment mechanism.

10. The stop drive control device according to claim 7, wherein the processor is configured to:

in a case where a difference between the target opening degree and a current opening degree is equal to or larger than a sixth threshold value set in advance, drive the stop opening degree adjustment mechanism to set the current opening degree to the target opening degree; and in a case where the difference is less than the sixth threshold value, maintain the current opening degree without driving the stop opening degree adjustment mechanism.

11. The stop drive control device according to claim 7, wherein the processor is configured to:

change driving force applied to the stop from the stop opening degree adjustment mechanism according to an operation speed of the zoom lens.

12. An imaging apparatus comprising:

the stop drive control device according to claim 1.

13. An operation method of a stop drive control device comprising:

for each frame sequentially output by an imaging element, storing, in a storage unit, a record associating a target opening degree of a stop with a current opening degree of the stop as part of opening degree history information comprising a plurality of records; and performing drive control of a stop opening degree adjustment mechanism that adjusts an opening degree of a stop, based on the opening degree history information, the drive control being in accordance with a fluctuation of a focal length of a zoom lens during operation of the zoom lens.

14. A non-transitory computer-readable storage medium storing an operation program of a stop drive control device causing a computer to execute a process comprising:

for each frame sequentially output by an imaging element, storing, in a storage unit, a record associating a target opening degree of a stop with a current opening degree of the stop as part of opening degree history information comprising a plurality of records; and performing drive control of a stop opening degree adjustment mechanism that adjusts an opening degree of a stop, based on the opening degree history information, the drive control being in accordance with a fluctuation of a focal length of a zoom lens during operation of the zoom lens.

* * * * *